United States Patent
Borke

(10) Patent No.: US 10,130,221 B2
(45) Date of Patent: *Nov. 20, 2018

(54) OPTIMIZING A DISPENSING PARAMETER OF A PRODUCT DISPENSER BASED ON PRODUCT USAGE DATA

(71) Applicant: GPCP IP HOLDINGS LLC, Atlanta, GA (US)

(72) Inventor: Brian Scott Borke, Appleton, WI (US)

(73) Assignee: GPCP IP HOLDINGS LLC, Atlanta, GA (US)

( * ) Notice: Subject to any disclaimer, the term of this patent is extended or adjusted under 35 U.S.C. 154(b) by 77 days.

This patent is subject to a terminal disclaimer.

(21) Appl. No.: 15/213,910

(22) Filed: Jul. 19, 2016

(65) Prior Publication Data

US 2016/0325957 A1  Nov. 10, 2016

Related U.S. Application Data

(63) Continuation-in-part of application No. 14/604,232, filed on Jan. 23, 2015, now Pat. No. 9,645,561.

(51) Int. Cl.
*A47K 10/38* (2006.01)
*G05B 15/02* (2006.01)
(Continued)

(52) U.S. Cl.
CPC ............ *A47K 10/38* (2013.01); *A47K 5/1217* (2013.01); *A47K 10/36* (2013.01); *G05B 15/02* (2013.01);
(Continued)

(58) Field of Classification Search
CPC .................... A47K 10/36; A47K 10/38; A47K 2010/3226; B65H 2220/01
See application file for complete search history.

(56) References Cited

U.S. PATENT DOCUMENTS 5,882,743 A   3/1999  McConnell
6,695,246 B1  2/2004  Elliott et al.
(Continued)

FOREIGN PATENT DOCUMENTS

WO   WO/2008/042382 A2   4/2008

OTHER PUBLICATIONS

International Search Report and Written Opinion for International Application No. PCT/US2016/013608, dated May 2, 2016.

*Primary Examiner* — Timothy R Waggoner
(74) *Attorney, Agent, or Firm* — Nelson Mullins Riley & Scarborough-Georgia Pacific

(57) ABSTRACT

Systems, methods, and apparatuses for optimizing performance of a product dispenser are provided herein. Depending on the circumstances surrounding the product dispenser (e.g., the environment, the type or habits of users or individual users, etc.), initial dispensing parameter settings of the product dispenser may be undesirable. Using monitored usage data, optimized dispensing parameters can be determined to achieve more desirable usage of the product dispenser (e.g., decrease waste, power save, increase efficiency, etc.). Additionally, using bounding parameters and/or information from the environment (e.g., nearby product dispensers) can lead to further optimized performance of the product dispenser. User or group specific optimized dispensing parameters can also be determined and used.

22 Claims, 13 Drawing Sheets

(51) Int. Cl.
*A47K 5/12* (2006.01)
*A47K 10/36* (2006.01)
*A47K 10/32* (2006.01)

(52) U.S. Cl.
CPC .. *A47K 10/3625* (2013.01); *A47K 2010/3226* (2013.01); *A47K 2010/3266* (2013.01); *A47K 2010/3668* (2013.01); *A47K 2010/3881* (2013.01)

(56) References Cited

U.S. PATENT DOCUMENTS

| | | | |
|---|---|---|---|
| 6,727,818 B1 | 4/2004 | Wildman et al. | |
| 6,988,689 B2 | 1/2006 | Thomas et al. | |
| 7,594,622 B2 | 9/2009 | Witt et al. | |
| 7,726,599 B2 | 6/2010 | Lewis et al. | |
| 7,783,380 B2 | 8/2010 | York et al. | |
| 8,231,075 B2 | 7/2012 | Troutman et al. | |
| 8,231,076 B2 | 7/2012 | Troutman et al. | |
| 8,434,709 B2 | 5/2013 | Troutman et al. | |
| 8,600,547 B2 | 12/2013 | Petersen et al. | |
| 8,919,688 B2 | 12/2014 | Kuehneman et al. | |
| 9,437,103 B2 | 9/2016 | Ophardt | |
| 9,645,561 B2 * | 5/2017 | Borke | G05B 15/02 |
| 2005/0171634 A1 * | 8/2005 | York | A47K 5/06 700/231 |
| 2006/0173576 A1 | 8/2006 | Goerg et al. | |
| 2007/0080255 A1 | 4/2007 | Witt et al. | |
| 2008/0077440 A1 | 3/2008 | Doron | |
| 2009/0069930 A1 | 3/2009 | Peters et al. | |
| 2010/0089939 A1 | 4/2010 | Morris et al. | |
| 2010/0269653 A1 | 10/2010 | Larsson | |
| 2013/0018506 A1 | 1/2013 | Cittadino | |
| 2014/0008346 A1 | 1/2014 | Zhu et al. | |
| 2014/0158809 A1 | 6/2014 | Borke | |
| 2016/0214817 A1 | 7/2016 | Borke et al. | |

* cited by examiner

OPTIMIZING A DISPENSING PARAMETER OF A PRODUCT DISPENSER BASED ON PRODUCT USAGE DATA

CROSS-REFERENCE TO RELATED APPLICATION(S)

This application claims priority to and is a continuation-in-part application of U.S. patent application Ser. No. 14/604,232, filed Jan. 23, 2015, entitled "Optimizing A Dispensing Parameter of a Product Dispenser Based on Product Usage Data", which is hereby incorporated by reference in its entirety.

FIELD OF THE INVENTION

Embodiments of the present invention relate generally to product dispensers and, more particularly, to systems, assemblies, and associated methods for optimizing a dispensing parameter of a product dispenser.

BACKGROUND OF THE INVENTION

Users may utilize product dispensers that dispense a variety of types of products such as, for example, sheet products, solids, liquids, gases, or products that include—or exhibit characteristics of—multiple phases of matter such as gels, aerosols, foams, and so forth. An automated product dispenser, for example, may be configured to dispense a quantity of a product in response to detection of the movement or presence of an object (e.g., a user's hand) by a sensor. As another example, an automated product dispenser may operate in "hang-mode" and may include a tear sensor that detects when a product, such as a sheet product, has been separated from a product roll and generates a signal that causes the dispenser to dispense additional sheet product of a predetermined length. Various settings for controlling the operation of a product dispenser may be configurable such as, for example, an incremental amount of the product dispensed during each dispensing cycle.

BRIEF SUMMARY OF THE INVENTION

While a product dispenser may, in some cases, be initially configured to optimize product usage, circumstances surrounding the product dispenser (e.g., the environment, the type or habits of users or individual users, etc.) may cause the initial dispensing parameter settings to be less desirable. In this regard, embodiments of the present invention seek to use monitored usage data to determine and optimize various dispensing parameters to achieve more desirable usage of the product dispenser (e.g., decrease waste, power save, increase efficiency, etc.). Additional techniques, such as bounding certain dispensing parameters based on other factors (such as user frustration) or factoring in other information from the environment (e.g., nearby product dispensers), can be applied to further optimize performance of the product dispenser. Further, knowledge of specific users can be utilized to form a user or group specific optimized dispensing parameter for further efficient and desirable use of the product dispenser.

In an example embodiment, a method for bounding a dispensing parameter of one or more product dispensers is provided. The method comprises receiving usage data from a dispensing period of the one or more product dispensers. The dispensing period comprises a plurality of dispenses of product by at least one dispensing mechanism of the one or more product dispensers performed in accordance with a value of the dispensing parameter. The method further comprises determining, by at least one controller and based on the usage data from the dispensing period, a usage rate of the product. The usage rate is based on an amount of product dispensed during the dispensing period and a number of users of the one or more product dispensers during the dispensing period. The method further comprises determining, based on at least the usage rate and the value of the dispensing parameter from the dispensing period, an improved value for the dispensing parameter such that at least one of the one or more product dispensers has an improved usage rate when the dispensing parameter is set to the optimized value. The method further comprises comparing the determined improved value of the dispensing parameter with a bounded value threshold to determine if the improved value satisfies the bounded value threshold. The method further comprises causing the one or more product dispensers to adjust the dispensing parameter to the improved value in an instance in which the improved value satisfies the bounded value threshold.

In some embodiments, the value of the dispensing parameter is a first value of the dispensing parameter, the dispensing period is a first dispensing period, and the usage rate is a first usage rate. In such embodiments, method comprises determining the improved value for the dispensing parameter by receiving second usage data from a second dispensing period of the one or more product dispensers. The second dispensing period comprises a second plurality of dispenses of product by the at least one dispensing mechanism of the one or more product dispensers performed in accordance with a second value of the dispensing parameter. Additionally, determining the improved value for the dispensing parameter comprises determining, based on the second usage data from the second dispensing period, a second usage rate of the product. The second usage rate is based on an amount of product dispensed during the second dispensing period and a number of users of the one or more product dispensers during the second dispensing period. Additionally, determining the improved value for the dispensing parameter comprises determining the improved value of the dispensing parameter based on the first usage rate of the first dispensing period, the first value of the dispensing parameter, the second usage rate of the second dispensing period, and the second value of the dispensing parameter.

In some embodiments, the method comprises determining the improved value for the dispensing parameter by comparing the usage rate of the dispensing period to a predetermined optimal usage rate.

In some embodiments, the product is paper towel, the dispensing parameter is sheet length of the paper towel per dispense, and the bounded value threshold is one of a minimum sheet length or a maximum sheet length.

In some embodiments, the method further comprising determining, in an instance in which the optimized value does not satisfy the bounded value threshold, a revised improved value of the dispensing parameter such that the one or more product dispensers are configured to have an improved usage rate when the dispensing parameter is set to the revised improved value and the revised improved value satisfies the bounded value threshold.

In some embodiments, the bounded value threshold is based on determined user frustration. In some embodiments, the method further comprises determining the bounded value threshold based on a position of a bounded value threshold switch of the one or more product dispensers.

In another embodiment, a product dispenser is provided. The product dispenser comprises at least one dispensing mechanism, at least one memory with computer-executable instructions stored thereon, a controller operatively coupled to the dispensing mechanism, and the at least one memory. The controller is configured to access the at least one memory and execute the computer-executable instructions to receive usage data from a dispensing period of the product dispenser. The dispensing period comprises a plurality of dispenses of product by the at least one dispensing mechanism performed in accordance with a value of a dispensing parameter. The controller is further configured to execute the computer-executable instructions to determine, based on the usage data from the dispensing period, a usage rate of the product. The usage rate is based on an amount of product dispensed during the dispensing period and a number of users of the product dispenser during the dispensing period. The controller is further configured to execute the computer-executable instructions to determine, based on at least the usage rate and the value of the dispensing parameter from the dispensing period, an improved value for the dispensing parameter such that the product dispenser has an improved usage rate when the dispensing parameter is set to the optimized value. The controller is further configured to execute the computer-executable instructions to compare the determined improved value of the dispensing parameter with a bounded value threshold to determine if the improved value satisfies the bounded value threshold. The controller is further configured to execute the computer-executable instructions to cause adjustment of the dispensing parameter to the improved value in an instance in which the improved value satisfies the bounded value threshold.

In some embodiments, the product is paper towel, the dispensing parameter is sheet length of the paper towel per dispense, and the bounded value threshold is one of a minimum sheet length or a maximum sheet length.

In some embodiments, the product dispenser further includes a bounded value threshold switch that is configured to be positioned to one of a plurality of bounded value threshold positions. Each bounded value threshold position corresponds to a different bounded value threshold for the dispensing parameter. Additionally, the controller is further configured to execute the computer-executable instructions to determine the bounded value threshold of the dispensing parameter based on the position of the bounded value threshold switch.

Depending on the configuration, the product dispenser may also include additional embodiments as described herein, such as described above with respect to the first example method.

In another example embodiment, a method for bounding a dispensing parameter of one or more product dispensers is provided. The method comprises receiving usage data from a dispensing period of one or more product dispensers. The dispensing period comprises a plurality of dispenses of product by at least one dispensing mechanism of the one or more product dispensers performed in accordance with a value of a first dispensing parameter. The method further comprises determining, by at least one controller and based on the usage data from the dispensing period, a usage rate of the product. The usage rate is based on an amount of product dispensed during the dispensing period and a number of users of the one or more product dispensers during the dispensing period. The method further comprises determining, based on at least the usage rate and the value of the first dispensing parameter from the dispensing period, an improved value for the first dispensing parameter such that at least one of the one or more product dispensers has an improved usage rate when the first dispensing parameter is set to the improved value. The method further comprises determining a value of a second dispensing parameter. The method further comprises comparing the value of the second dispensing parameter with a bounded value threshold to determine if the value of the second dispensing parameter satisfies the bounded value threshold. The method further comprises causing the one or more product dispensers to adjust the first dispensing parameter to the improved value in an instance in which the value of the second dispensing parameter satisfies the bounded value threshold.

In some embodiments, the method further comprises determining the value of the second dispensing parameter by performing a theoretical operation of the one or more product dispensers using the improved value for the first dispensing parameter.

In some embodiments, the method further comprises determining the value of the second dispensing parameter by determining the value of the second dispensing parameter based on the usage data of the dispensing period.

In some embodiments, the value of the first dispensing parameter is a first value of the first dispensing parameter, the dispensing period is a first dispensing period, and the usage rate is a first usage rate. In such embodiments, the method may further comprise determining the improved value for the first dispensing parameter by receiving second usage data from a second dispensing period of the one or more product dispensers. The second dispensing period comprises a second plurality of dispenses of product by the at least one dispensing mechanism of the one or more product dispensers performed in accordance with a second value of the first dispensing parameter. The method may further comprise determining the improved value for the first dispensing parameter by determining, based on the second usage data from the second dispensing period, a second usage rate of the product, wherein the second usage rate is based on an amount of product dispensed during the second dispensing period and a number of users of the one or more product dispensers during the second dispensing period. The method may further comprise determining the improved value for the first dispensing parameter by determining the improved value of the first dispensing parameter based on the first usage rate of the first dispensing period, the first value of the first dispensing parameter, the second usage rate of the second dispensing period, and the second value of the first dispensing parameter.

In some embodiments, the method may further comprise determining the improved value for the first dispensing parameter by comparing the usage rate of the dispensing period to a pre-determined optimal usage rate.

In some embodiments, the product is paper towel, the second dispensing parameter is an average number of sheets of paper towel per dispenser per user, and the bounded value threshold is one of a minimum average number of sheets of paper towel per dispenser per user or a maximum average number of sheets of paper towel per dispenser per user.

In some embodiments, the method may further comprise determining, in an instance in which the value of the second dispensing parameter does not satisfy the bounded value threshold, a revised improved value of the first dispensing parameter such that at least one of the one or more product dispensers has an improved usage rate when the first dispensing parameter is set to the revised improved value and a revised value of the second dispensing parameter satisfies the bounded value threshold.

In some embodiments, the bounded value threshold is based on determined user frustration.

In some embodiments, the method further comprises determining the bounded value threshold based on a position of a bounded value threshold switch of the one or more product dispensers.

In another embodiment, a product dispenser is provided. The product dispenser comprises at least one dispensing mechanism, at least one memory with computer-executable instructions stored thereon, a controller operatively coupled to the dispensing mechanism, and the at least one memory. The controller is configured to access the at least one memory and execute the computer-executable instructions to receive usage data from a dispensing period of the product dispenser. The dispensing period comprises a plurality of dispenses of product by the at least one dispensing mechanism performed in accordance with a value of a first dispensing parameter. The controller is further configured to execute the computer-executable instructions to determine, based on the usage data from the dispensing period, a usage rate of the product. The usage rate is based on an amount of product dispensed during the dispensing period and a number of users of the product dispenser during the dispensing period. The controller is further configured to execute the computer-executable instructions to determine, based on at least the usage rate and the value of the first dispensing parameter from the dispensing period, an improved value for the first dispensing parameter such that the product dispenser is configured to have an improved usage rate when the first dispensing parameter is set to the improved value. The controller is further configured to execute the computer-executable instructions to determine a value of a second dispensing parameter. The controller is further configured to execute the computer-executable instructions to compare the value of the second dispensing parameter with a bounded value threshold to determine if the value of the second dispensing parameter satisfies the bounded value threshold. The controller is further configured to execute the computer-executable instructions to cause adjustment of the first dispensing parameter to the improved value in an instance in which the value of the second dispensing parameter satisfies the bounded value threshold.

In some embodiments, the product is paper towel, the second dispensing parameter is an average number of sheets of paper towel per dispenser per user, and the bounded value threshold is one of a minimum average number of sheets of paper towel per dispenser per user or a maximum average number of sheets of paper towel per dispenser per user.

In some embodiments, the product dispenser further includes a bounded value threshold switch that is configured to be positioned to one of a plurality of bounded value threshold positions. Each bounded value threshold position corresponds to a different bounded value threshold for the second dispensing parameter. Additionally, the controller is configured to execute the computer-executable instructions to determine the bounded value threshold of the second dispensing parameter based on the position of the bounded value threshold switch.

Depending on the configuration, the product dispenser may also include additional embodiments as described herein, such as described above with respect to the second example method.

In another embodiment, a method for determining a single user during a dispensing period for two or more product dispensers is provided. The method comprises receiving first usage data from the dispensing period for a first product dispenser, wherein the dispensing period comprises a plurality of dispenses of product by at least one first dispensing mechanism of the first product dispenser, wherein the first usage data includes at least first time data associated with one or more dispenses by the at least one first dispensing mechanism. The method further comprises receiving second usage data from the dispensing period for a second product dispenser, wherein the dispensing period comprises a plurality of dispenses of product by at least one second dispensing mechanism of the second product dispenser, wherein the second usage data includes at least second time data associated with one or more dispenses by the at least one second dispensing mechanism. The method further comprises processing, by at least one controller and based on the first time data and the second time data, the first usage data and the second usage data from the dispensing period to determine if a time period between a dispense by the at least one first dispensing mechanism of the first product dispenser and a dispense by the at least one second dispensing mechanism of the second product dispenser satisfies a time period threshold. The method further comprises determining that a single user caused the dispense by the at least one first dispensing mechanism of the first product dispenser and the dispense by the at least one second dispensing mechanism of the second product dispenser in an instance in which the time period satisfies the time period threshold.

In some embodiments, the method further comprises determining a first plurality of dispenses where the time period between consecutive dispenses by the at least one first dispensing mechanism of the first product dispenser is less than a first time period threshold. The method further comprises determining a first number of users for the first plurality of dispenses that assigns a single user to each set of consecutive dispenses. The method further comprises determining a second plurality of dispenses where the time period between consecutive dispenses by the at least one second dispensing mechanism of the second product dispenser is less than a second time period threshold. The method further comprises determining a second number of users for the second plurality of dispenses that assigns a single user to each set of consecutive dispenses. The method further comprises determining a third plurality of dispenses from any remaining plurality of dispenses after removal of the first plurality of dispenses from the dispensing period and any remaining plurality of dispenses after removal of the second plurality of dispenses from the dispensing period where the time period between the dispense by the at least one first dispensing mechanism of the first product dispenser and the dispense by the at least one second dispensing mechanism of the second product dispenser is less than a third time period threshold. The method further comprises determining a third number of users from the third plurality of dispenses that assigns a single user to each set of dispenses where the dispense by the at least one first dispensing mechanism of the first product dispenser and the dispense by the at least one second dispensing mechanism of the second product dispenser is less than the third time period threshold. The method further comprises determining a fourth number of users corresponding to each remaining dispense after removal of the first plurality of dispenses, the second plurality of dispenses, and the third plurality of dispenses. The method further comprises summing the first number of users, the second number of users, the third number of users, and the fourth number of users to determine the number of users during the dispensing period for both the first product dispenser and the second product dispenser.

In some embodiments, the method further comprises determining the number of users during the dispensing period based at least in part on the determination that a single user caused the dispense by the at least one first dispensing mechanism of the first product dispenser and the dispense by the at least one second dispensing mechanism of the second product dispenser.

In yet another embodiment, a method for determining a number of users during a dispensing period for a product dispenser is provided. The method comprises receiving first usage data from the dispensing period for a first product dispenser, wherein the dispensing period comprises a plurality of dispenses of product by at least one first dispensing mechanism of the first product dispenser, wherein the first usage data includes at least first time data associated with each dispense by the at least one first dispensing mechanism, wherein the first product dispenser is configured to dispense a first product type, wherein the product type comprises one of tissue paper, paper towel, soap, air freshener, or detergent. The method further comprises receiving second usage data from the dispensing period for a second product dispenser, wherein the dispensing period comprises a plurality of dispenses of product by at least one second dispensing mechanism of the second product dispenser, wherein the second usage data includes at least second time data associated with each dispense by the at least one second dispensing mechanism, wherein the second product dispenser is configured to dispense a second product type, wherein the second product type is different than the first product type. The method further comprises processing, by at least one controller and based on the first time data and the second time data, the first usage data and the second usage data from the dispensing period to determine if a time period between two or more dispenses by the at least one first dispensing mechanism of the first product dispenser and a dispense by the at least one second dispensing mechanism of the second product dispenser satisfies a time period threshold. The method further comprises determining that a single user caused the two or more dispenses by the at least one first dispensing mechanism of the first product dispenser in an instance in which the time period satisfies the time period threshold. The method further comprises determining the number of users during the dispensing period based at least in part on the determination that a single user caused the two or more dispenses by the at least one first dispensing mechanism of the first product dispenser.

In some embodiments, the first product type is paper towel and the second product type is soap.

In another embodiment, a method for determining a number of users during a dispensing period for two or more product dispensers is provided. The method comprises receiving first usage data from the dispensing period for a first product dispenser, wherein the dispensing period comprises a plurality of dispenses of product by at least one first dispensing mechanism of the first product dispenser, wherein the first usage data includes at least first time data associated with each dispense by the at least one first dispensing mechanism, wherein the first product dispenser is configured to dispense a first product type, wherein the product type comprises one of tissue paper, paper towel, soap, air freshener, or detergent. The method further comprises receiving second usage data from the dispensing period for a second product dispenser, wherein the dispensing period comprises a plurality of dispenses of product by at least one second dispensing mechanism of the second product dispenser, wherein the second usage data includes at least second time data associated with each dispense by the at least one second dispensing mechanism, wherein the second product dispenser is configured to dispense the first product type such that the first product dispenser and the second product dispenser are configured to dispense the same product type. The method further comprises processing, based on the first time data and the second time data, the first usage data and the second usage data from the dispensing period to determine if a time period between a dispense by the at least one first dispensing mechanism of the first product dispenser and a dispense by the at least one second dispensing mechanism of the second product dispenser satisfies a consecutive time period threshold such that the dispense of the first product dispenser and the dispense of the second product dispenser were consecutive. The method further comprises receiving third usage data from the dispensing period for a third product dispenser, wherein the dispensing period comprises a plurality of dispenses of product by at least one third dispensing mechanism of the third product dispenser, wherein the third usage data includes at least third time data associated with each dispense by the at least one third dispensing mechanism, wherein the third product dispenser is configured to dispense a second product type, wherein the second product type is different than the first product type. The method further comprises processing, based on the first time data, the second time data, and the third time data, the first usage data, the second usage data, and the third usage data from the dispensing period to determine if a time period between the consecutive dispenses by the first product dispenser and the second product dispenser and a dispense by the at least one third dispensing mechanism of the third product dispenser satisfies a single user time period threshold. The method further comprises determining that a single user caused the dispense by the at least one first dispensing mechanism of the first product dispenser and the dispense by the at least one second dispensing mechanism of the second product dispenser in an instance in which the time period satisfies the single user time period threshold. The method further comprises determining the number of users during the dispensing period based at least in part on the determination that a single user caused the dispense by the at least one first dispensing mechanism of the first product dispenser and the dispense by the at least one second dispensing mechanism of the second product dispenser.

In some embodiments, the first product type is paper towel and the second product type is soap.

In yet another embodiment, a method for optimizing a dispensing parameter of one or more product dispensers is provided. The method comprises receiving usage data from a dispensing period of the one or more product dispensers, wherein the dispensing period comprises a plurality of dispenses of product by at least one dispensing mechanism of the one or more product dispensers performed in accordance with a value of the dispensing parameter, wherein the usage data includes external factor data, wherein the external factor data comprises at least one of time range data associated with the plurality of dispenses, characteristic hand data associated with activation of a sensor for the plurality of dispenses, motion direction data associated with activation of a sensor for the plurality of dispenses, optical data associated with the plurality of dispenses, audio data associated with the plurality of dispenses, biological user data associated with the plurality of dispenses, or user identification data associated with the plurality of dispenses. The method further comprises filtering, by at least one controller, the usage data to form at least one grouping of dispenses that are each associated with external factor data having the same properties such that the at least one grouping of dispenses has at least one of time range data with the same properties, characteristic hand data with the same properties, motion direction data with the same properties, optical data with the same properties, audio data with the same properties, biological user data with the same properties, or user identification data with the same properties. The method further comprises determining, based on the usage data of the at least one grouping from the dispensing period, a usage rate of the product from the at least one grouping, wherein the usage rate is based on an amount of product dispensed during the dispensing period for the dispenses within the at least one grouping and a number of users of the one or more product dispensers during the dispensing period for the dispenses within the at least one grouping. The method further comprises determining, based on at least the usage rate and the value of the dispensing parameter from the dispensing period, an improved value for the dispensing parameter for the at least one grouping such that at least one of the one or more product dispensers has an improved usage rate of product for the at least one grouping when the dispensing parameter is set to the improved value. The method further comprises causing the one or more product dispensers to adjust the dispensing parameter to the improved value in an instance in which external factor data with the same properties is received during activation of the sensor so as to cause a dispense in accordance with the improved value for the dispensing parameter in a situation in which the external factor data with the same properties associated with the at least one grouping is detected.

In another embodiment, a method for determining a number of users during a dispensing period for one or more product dispensers is provided. The method comprises receiving usage data from the dispensing period of the one or more product dispensers, wherein the dispensing period comprises a plurality of dispenses of product by at least one dispensing mechanism of the one or more product dispensers, wherein the usage data includes external factor data, wherein the external factor data comprises at least one of characteristic hand data associated with activation of a sensor for the plurality of dispenses, motion direction data associated with activation of a sensor for the plurality of dispenses, optical data associated with the plurality of dispenses, audio data associated with the plurality of dispenses, biological user data associated with the plurality of dispenses, or user identification data associated with the plurality of dispenses. The method further comprises determining, by at least one controller, two or more consecutive dispenses of the plurality of dispenses during the dispensing period. The method further comprises comparing external factor data associated with each dispense of the two or more consecutive dispenses to determine if the external factor data has the same properties such that the two or more consecutive dispenses has at least one of characteristic hand data with the same properties, motion direction data with the same properties, optical data with the same properties, audio data with the same properties, biological user data with the same properties, or user identification data with the same properties. The method further comprises determining, in an instance in which the external factor data for the two or more consecutive dispenses has the same properties, that a single user accounted for the two or more consecutive dispenses. The method further comprises determining the number of users during the dispensing period based at least in part on the determination that a single user accounted for the two or more consecutive dispenses.

In another embodiment, a method for optimizing a dispensing parameter of one or more product dispensers is provided. The method comprises receiving usage data from a dispensing period of the one or more product dispensers, wherein the dispensing period comprises a plurality of dispenses of product by at least one dispensing mechanism of the one or more product dispensers performed in accordance with a value of the dispensing parameter. The method further comprises processing, by at least one controller, the usage data from the dispensing period to determine one or more dispenses from the dispensing period that correspond to skewed data that is not representative of a normal use of the one or more product dispensers. The method further comprises filtering the usage data to remove the determined one or more dispenses. The method further comprises determining, based on the filtered usage data, a usage rate of the product from the at least one grouping, wherein the usage rate is based on an amount of product dispensed during the dispensing period for the dispenses within the filtered usage data and a number of users of the one or more product dispensers during the dispensing period for the dispenses within the filtered usage data. The method further comprises determining, based on at least the usage rate and the value of the dispensing parameter from the dispensing period, an improved value for the dispensing parameter such that the one or more product dispensers are configured to have an improved usage rate of product when the dispensing parameter is set to the improved value. The method further comprises causing the one or more product dispensers to adjust the dispensing parameter to the improved value.

In yet another embodiment, a method for determining a number of users during a dispensing period for one or more product dispensers is provided. The method comprises receiving usage data from the dispensing period of the one or more product dispensers, wherein the dispensing period comprises a plurality of dispenses of product by at least one dispensing mechanism of the one or more product dispensers, wherein the usage data includes at least time data associated with each dispense. The method further comprises processing, by at least one controller, the usage data from the dispensing period to determine one or more dispenses from the dispensing period that correspond to skewed data that is not representative of a normal use of the one or more product dispensers. The method further comprises filtering the usage data to remove the determined one or more dispenses. The method further comprises processing the filtered usage data and the corresponding time data to determine if two or more consecutive dispenses of the plurality of dispenses during the dispensing period were performed by a single user. The method further comprises determining the number of users during the dispensing period based at least in part on the determination that a single user accounted for the two or more consecutive dispenses.

In another embodiment, a method for optimizing a dispensing parameter of one or more product dispensers is provided. The method comprises receiving usage data from a dispensing period of the one or more product dispensers, wherein the dispensing period comprises a plurality of dispenses of product by at least one dispensing mechanism of the one or more product dispensers performed in accordance with a value of the dispensing parameter. The method further comprises determining, by at least one controller and based on the usage data from the dispensing period, a usage rate of the product, wherein the usage rate is based on an amount of product dispensed during the dispensing period and a number of users of the one or more product dispensers during the dispensing period. The method further comprises determining, based on the usage data, a user frustration modification factor that accounts for user frustration exhibited during the dispensing period. The method further comprises determining a modified usage rate that is formed based on the usage rate and the user frustration modification factor. The method further comprises determining, based on at least the modified usage rate and the value of the dispensing parameter from the dispensing period, an improved value for the dispensing parameter such that at least one of the one or more product dispensers has an improved modified usage rate when the dispensing parameter is set to the improved value. The method further comprises causing the one or more product dispensers to adjust the dispensing parameter to the improved value.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral identifies the drawing in which the reference numeral first appears. The use of the same reference numerals indicates similar, but not necessarily, the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Figure 1:
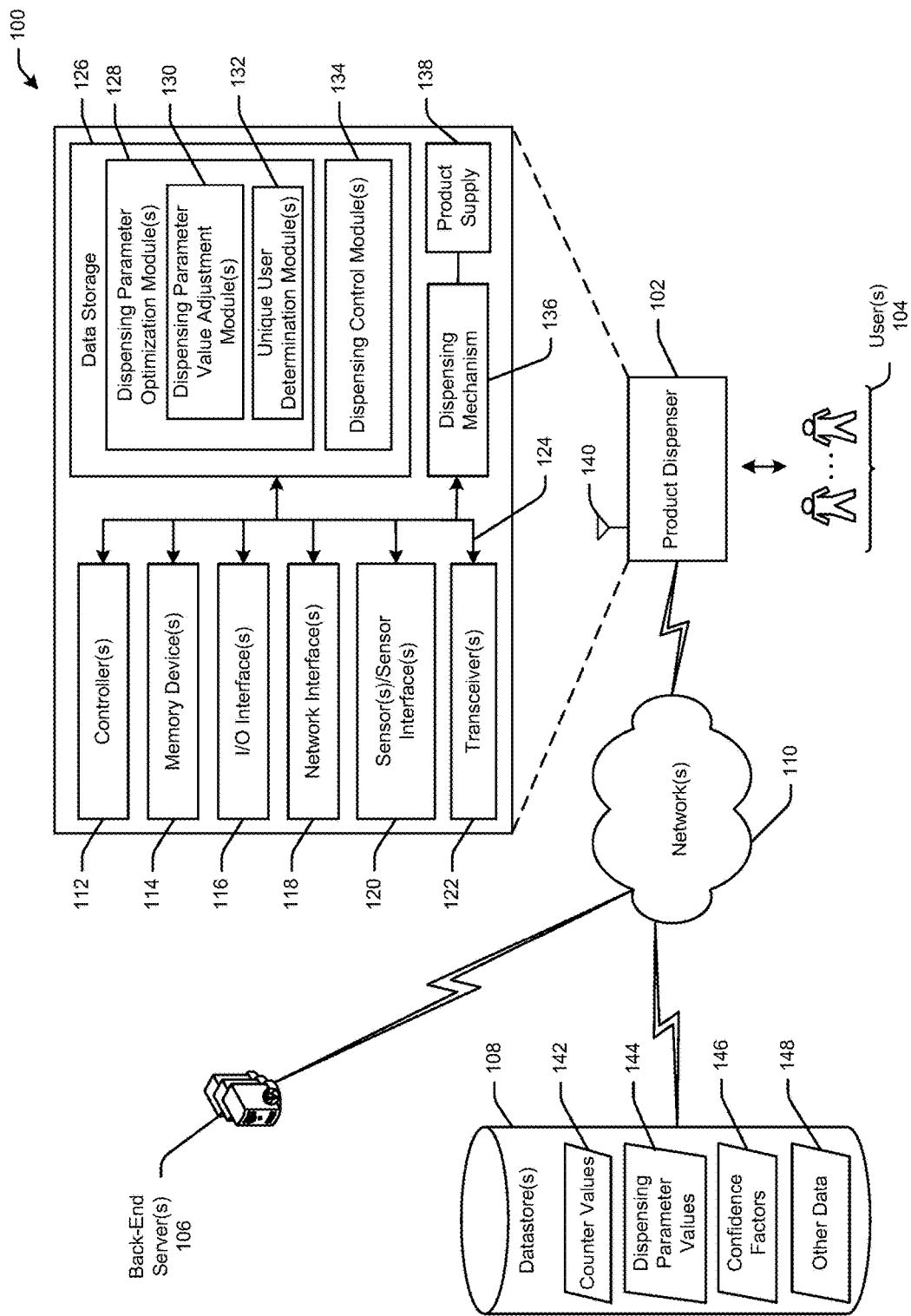
FIG. 1 is a diagram depicting a schematic representation of an illustrative product dispenser and an illustrative networked architecture that includes the product dispenser in accordance with one or more example embodiments of the disclosure.

Exemplary embodiments of the present invention now will be described more fully hereinafter with reference to the accompanying drawings, in which some, but not all embodiments of the invention are shown. Indeed, the invention may be embodied in many different forms and should not be construed as limited to the exemplary embodiments set forth herein; rather, these embodiments are provided so that this disclosure will satisfy applicable legal requirements. Like reference numerals refer to like elements throughout.

This disclosure relates to, among other things, devices, systems, methods, computer-readable media, techniques, and methodologies for optimizing a value of a dispensing parameter of a product dispenser based at least in part on product usage data. The dispensing parameter may include any suitable adjustable parameter of the product dispenser including, but not limited to, a dispense duration, a volume of product (e.g., a shot size), a sheet length, a product concentration, a capability of a user sensor to distinguish between genuine and false triggers of the sensor, a delay setting that specifies a delay time between successive dispenses, or the like. The value of the dispensing parameter may be optimized to align an actual performance outcome with a target performance outcome. The target performance outcome may include, for example, minimizing product usage per user, achieving a target number of sheets per user, achieving a desired time delay between dispenses, achieving a desired motor speed for dispensing, maximizing user sensor reliability (e.g., a percentage of dispenses that occur in response to genuine user-initiated triggering events), maximizing efficient operation of the product dispenser (e.g., power consumption), and so forth.

In an example embodiment, a product dispenser may be configured to dispense a certain quantity of a product during each dispensing cycle of the dispenser. The product dispenser may be an automated product dispenser that may include a user sensor, a dispensing mechanism, and a controller configured to generate a signal to actuate the dispensing mechanism to dispense a predetermined amount of product in response to a dispense signal generated by the user sensor. More specifically, the user sensor may generate a dispense signal in response to a triggering event, and the dispense signal may be received by the controller, which may then generate an actuation signal to actuate the dispensing mechanism to dispense the predetermined amount of product. While example embodiments of the disclosure may be described in the context of automated product dispensers, it should be appreciated that such embodiments may be applicable to mechanical/manually operated product dispensers, air blowers, and so forth.

The user sensor may be, for example, a photo sensor that includes a light source that generates a beam of focused light and a light sensor that detects a disruption in the light beam caused by an object (e.g., a user's hand) and generates a dispense signal in response to the detected disruption. As another example, the user sensor may be a radar-based sensor that transmits bursts of microwave or ultrasound energy and analyzes a pattern of the reflected energy to determine whether a triggering event has occurred. The presence of an object (e.g., a user's hand) may cause the reflected energy to exhibit an irregular pattern, and the user sensor may generate a dispense signal in response to this detected irregular pattern. As yet another non-limiting example, the user sensor may be a passive infrared sensor that detects infrared energy emitted by an object. When an object (e.g., a user's hand) is in proximity of the sensor, the infrared energy detected by the sensor may fluctuate, causing the sensor to generate a dispense signal. As still another example, the product dispenser may operate in "hang-mode" in which removal of a length of sheet product exposed from an opening of the dispenser may cause a tear sensor of the dispenser to generate a dispense signal which, in turn, may cause another predetermined length of sheet product to be dispensed through the opening of the dispenser. Other example types of sensors may include, without limitation, active infrared sensors, capacitive sensors, and so forth. It should be appreciated that the above examples of types of sensors that may be employed is merely illustrative and not exhaustive.

It should further be appreciated that a product dispenser that includes a user sensor (e.g., a motion sensor, user proximity sensor, or the like) and dispenses product in response to a signal generated by the user sensor (e.g., an "on-demand" dispenser) may nonetheless also include a tear sensor that generates and sends a tear signal to the controller upon detection of a tear event. However, unlike a "hang-mode" dispenser, the controller of an "on-demand" dispenser may not initiate a dispensing cycle (e.g., energize a motor of the dispenser) responsive to receipt of the tear signal.

The dispensing mechanism of the product dispenser may include a motor that is energized by a power source (e.g., a battery) in response to an actuation signal received from a controller of the dispenser. Upon being energized, the motor may actuate a pumping mechanism and/or one or more other components of the dispensing mechanism (e.g., mechanical rollers) to cause an amount of product to be dispensed as part of a dispensing cycle. A dispensing cycle may refer to a particular instance in which the motor is energized and other component(s) of the dispensing mechanism are actuated to cause a predetermined amount of a product to be dispensed. It should be appreciated that, in certain example embodiments, less than the predetermined amount of a product may be dispensed during a dispensing cycle. For example, user behavior may cause the dispensing cycle to end prematurely before the predetermined amount of product is dispensed. For example, a user may tear off a sheet product from a sheet product dispenser before a predetermined amount of sheet length is dispensed, thereby prematurely halting the dispensing cycle and triggering a tear sensor of the product dispenser to generate a tear signal that causes the dispenser (if the dispenser is operating in "hang-mode") to dispense an additional predetermined amount of the product as part of a subsequent dispensing cycle.

Figure 6:
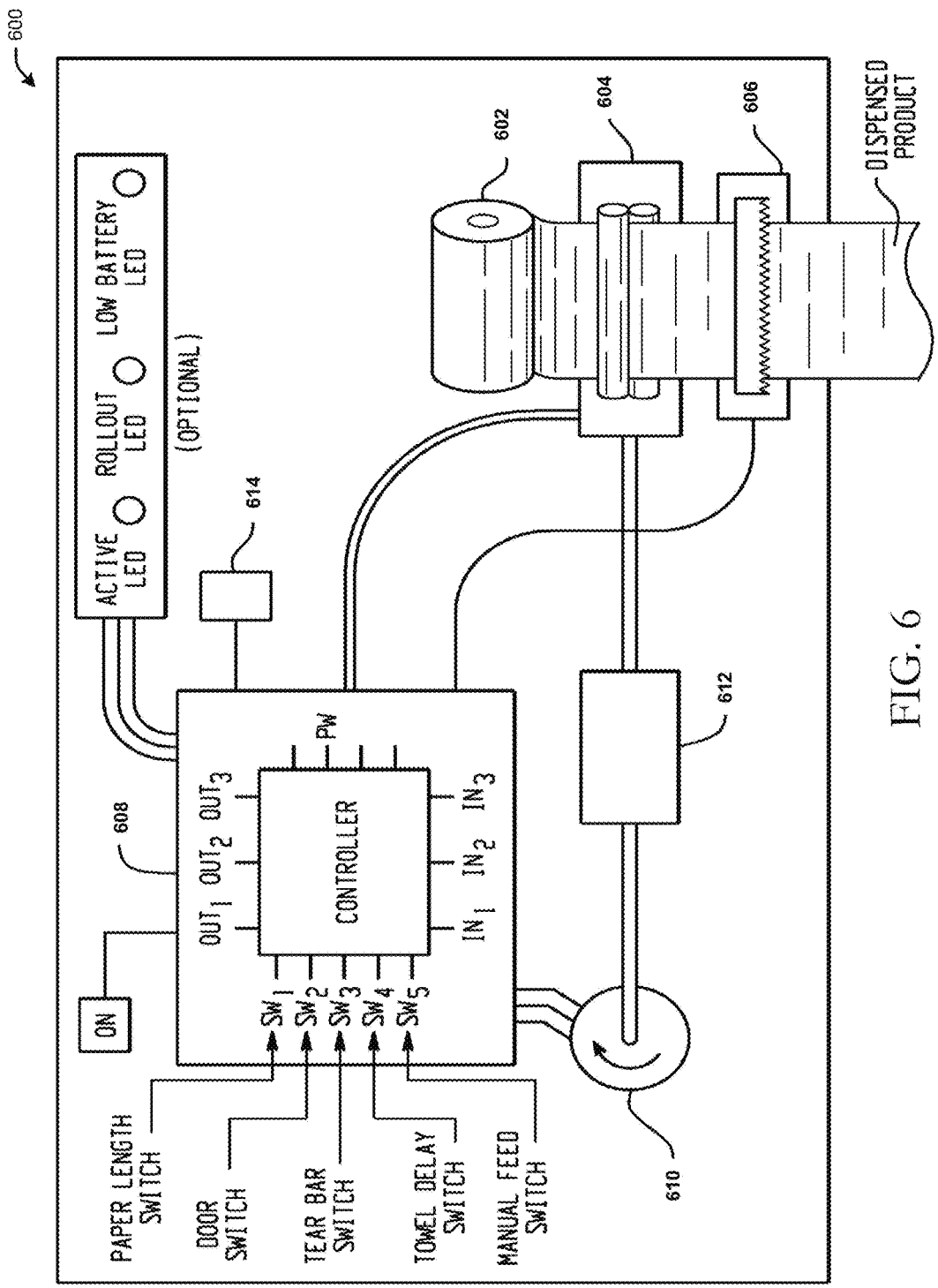
FIG. 6 is a schematic depiction of an example sheet product dispenser in accordance with one or more example embodiments of the disclosure.
Figure 7:
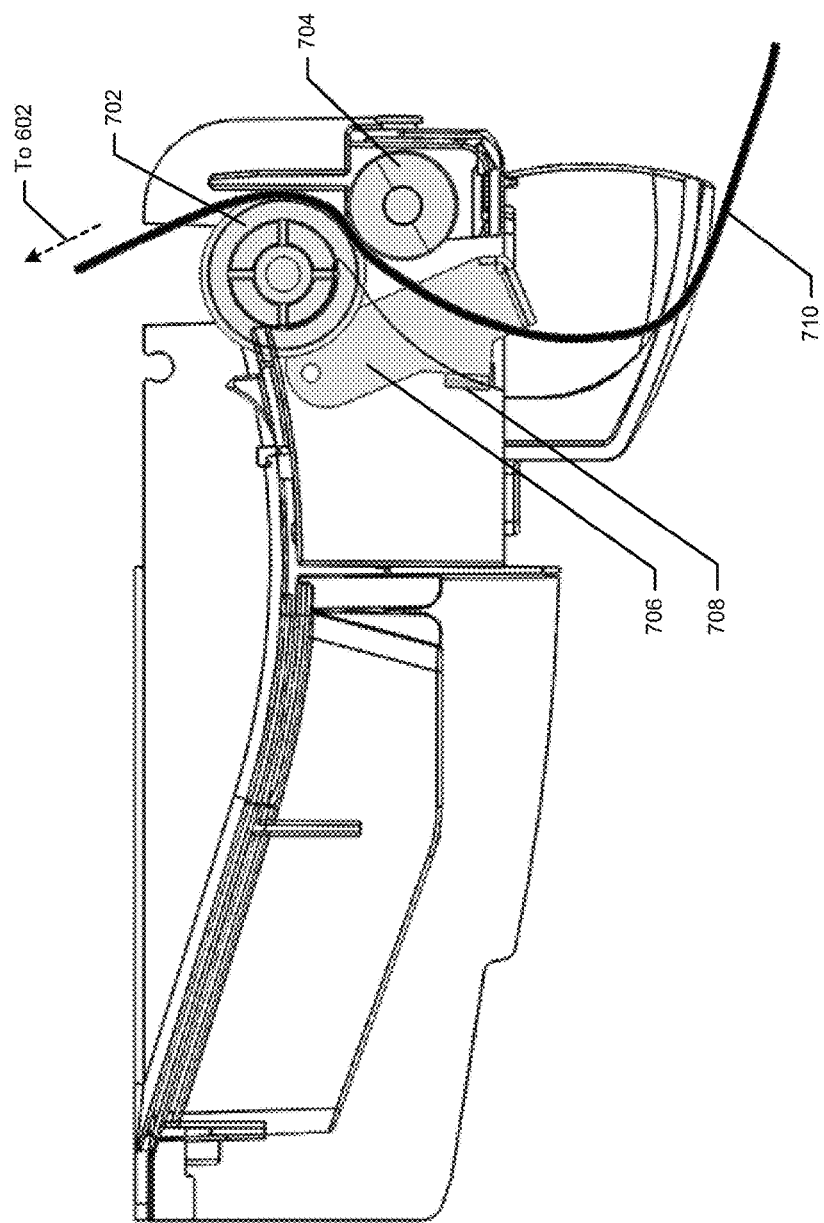
FIG. 7 is an illustrative depiction of a portion of an example sheet product dispenser in accordance with one or more example embodiments of the disclosure.

Referring to FIG. 6, an example sheet product dispenser 600 may include a sheet product supply, such as a roll 602 of sheet product (e.g., tissue or paper towel) and a feed mechanism 604 for moving sheet product within and out of the dispenser 600. The feed mechanism 604 (depicted in more detail in FIG. 7) may include a drive roller 702, a pinch roller 704 positioned in close proximity to the drive roller 702 to form a pinch or "nip" there between. The roll 602 of sheet product may be supported on roll holders apart from the drive roller 702 and the pinch roller 704, and a free end of the roll 602 may be threaded through the nip formed between the drive roller 702 and the pinch roller 704. The product dispenser 600 may be adapted for hands-free operation for dispensing one or more rolls 602 of sheet product.

The dispenser 600 may include a motor 610 and a transmission 612. The motor 610 may be, for example, a brushed direct current (DC) motor, a DC stepper motor, or the like. The transmission 612 may include any combination of gears, pulleys, belts, or the like for transferring rotational forces from the motor 610 to the feed mechanism 604. In an example embodiment, the transmission 612 may include a motor shaft that couples the motor 610 to the drive roller 702. The motor 610 may be powered by a power supply (not shown), such as a battery pack or external AC (e.g., with an appropriate transformer and adapter) or a DC power supply. Moreover, the dispenser 600 may be configured to be switched between battery power and AC power.

In operation, in response to an actuation signal generated by a controller 608 of the dispenser 600, a power supply may energize the motor 610 which may, in turn, actuate the drive roller 702 via the transmission 612. The actuation signal may be generated in response to a signal received from a user sensor 614 of the dispenser 600. Rotation of the drive roller 702 may cause the pinch roller 704 to rotate, thereby causing the sheet product to be pulled from the roll 602 through the nip formed between the drive roller 702 and the pinch roller 704 under the force of friction.

If the dispenser 600 is operating in hang-mode for example, the dispenser 600 may be configured to dispense sheet product in response to a signal received from a tear sensor of the dispenser 600. As depicted in FIG. 6 and in more detail in FIG. 7, the dispenser 600 may include a tear assembly 606 that may, in turn, include a tear bar 706 pivotably mounted to a body of the dispenser 600 and a switch 708 in communication with the controller 608. In operation, to remove a portion 710 of the sheet product roll 602, a user may apply a force on the portion 710 which may cause the portion 710 to engage the tear bar 706 and cause the tear bar 706 to pivot into contact with the switch 708. Upon engagement with the tear bar 706, the switch 708 may generate a signal indicating that a tear operation has taken place, which may be communicated to the controller 608. Upon receipt of this signal, the controller 608 may generate an actuation signal to cause a dispensing cycle to occur. It should be appreciated that in cases where perforated paper is dispensed, the tear bar 706 may be omitted.

In other example embodiments, the tear assembly 606 may include a stationary tear bar, a tear bail, and a switch in communication with the controller 606. In such example embodiments, in operation, to remove the portion 710 of the sheet product roll 602, a user may apply a force on the portion 710 against the stationary tear bar. As the portion 710 is pulled against the tear bar, contact may be made between the product sheet and the tear bail causing the tear bail to rotate into contact with the switch. Upon engagement with the tear bail, the switch may generate a signal indicating that a tear operation has taken place, which may then be communicated to the controller 608. It should be appreciated that a variety of other configurations and modes of operation are possible for the tear assembly 606.

The controller 608 may be any suitable controller such as, for example, a microcontroller. Example microcontrollers include, but are not limited to, an MSP430 Ultra Low-Power microcontroller manufactured by Texas Instruments, a proportional integral differential (PID) microcontroller configured to implement various stepper motor control techniques. Microchip,$^{Inc.!5}$™ CMOS FLASH-based 8-bit microcontroller, or the like. Inputs to the controller 608 may include a battery voltage signal, a tear bar activation signal, a cover switch signal, a paper length switch signal, a towel delay switch signal, a manual advance switch signal, and an ON switch signal. Outputs of the controller 608 may include motor control signals and LED signals. Motor control signals may be used to control the motor 610, and thus, the speed at which sheet product is moved by feed mechanism 604 as described herein.

In other example embodiments of the disclosure, a product dispenser may dispense solids, liquids, gases, or products that include—or exhibit characteristics of—multiple phases of matter such as gels, aerosols, foams, and so forth. For example, the product dispenser may be a soap dispenser. Such example product dispensers may include a product container for storing the product such as, for example, a bag or bottle. Such example product dispensers may further include a controller, a pump, and a motor. In response to an actuation signal received from the controller, the motor may actuate the pump to cause the pump to dispense a predetermined amount of the product (e.g., volume of product, weight of product, etc.) from the container.

In an example embodiment, a product dispenser may be initially configured to dispense a predetermined amount of a product in accordance with an initial value of a dispensing parameter. Referring to a sheet product length dispensing parameter solely for explanatory purposes, the sheet length may be pre-programmed to an initial value for an initial dispensing period. Alternatively, the initial value may be set manually using a physical button or switch or via user interaction with a user interface (e.g., a touch screen interface) of the product dispenser. It should be appreciated that the first and second dispensing periods may represent an initial dispensing period and a dispensing period that immediately follows the initial dispensing period, respectively, or may represent any two dispensing periods associated with operation of a product dispenser. The first and second dispensing periods may be consecutive or non-consecutive dispensing periods.

During the first dispensing period, a first number of dispensing cycles may be triggered, where each dispensing cycle may involve the dispensing of an amount of the product sheet corresponding to a first value of the dispensing parameter (which may be a preprogrammed initial value if, for example, the first dispensing period is an initial dispensing period). For some users, the sheet length corresponding to the first value may be sufficient to meet their needs. However, for other users, the sheet length corresponding to the first value may be insufficient to meet their needs, in which case, such users may trigger one or more additional dispensing cycles to obtain additional amounts of sheet product. A user that triggers multiple dispensing cycles may in actuality, however, require an intermediate amount of sheet product that is less than what is dispensed as part of the multiple dispensing cycles. For example, a sheet length of 12 inches may be insufficient for a particular user, in which case, the user may trigger two dispenses of the sheet product resulting in a total of 24 inches of sheet product being dispensed. A sheet length of 16 inches may, however, may have been sufficient to meet the needs of the user. As such, the additional 8 inches of sheet product that is dispensed may constitute a waste of product.

Accordingly, example embodiments of the disclosure are directed to processes for optimizing a value of a dispensing parameter (such as sheet product length) to minimize overall usage of the product across an aggregate number of users of a product dispenser who may exhibit varying user behavior with respect to the amount of product needed to meet their consumption needs. Optimization processes disclosed herein may be performed responsive to execution of executable instructions, code, or the like by a controller of a product dispenser and/or by one or more processing units that may be provided in a remote environment from a local environment in which the dispenser is provided. The executable instructions, code, or the like may be stored on local data storage of the product dispenser and/or may be stored on one or more remote storage media.

Still referring to the example embodiment introduced above, a first counter of the accumulated value of the dispensing parameter during the first dispensing period may be maintained. For example, the first counter may represent the total amount of sheet product dispensed during the first dispensing period. In certain example embodiments, the first counter may be incremented by the first value of the dispensing parameter after each dispense that occurs during the first dispensing period.

The value of a dispensing parameter that is used to increment the counter that represents an accumulated amount of product dispensed during a dispensing period may be a preprogrammed value (as may be the case with the initial dispensing period), a value calculated in accordance with an optimization process disclosed herein, or a directly measured value. If the value is measured, any of a variety of techniques may be used to obtain the measurement depending on the type of dispensing parameter. For example, if the dispensing parameter is sheet length, a number of revolutions of mechanical rollers of the product dispenser may be used to determine the sheet length dispensed. As another example, if the dispensing parameter is dispense duration, an amount of time that elapses between activation of the dispensing mechanism and deactivation of the dispensing mechanism may be measured. More particularly, in certain example embodiments, an amount of time that a motor of the product dispenser is activated may be measured and used as the dispense duration or correlated to a particular sheet length. Due to reduced power capacity of a power source of the dispenser (e.g., one or more batteries) over time, the motor may need to run for an increasingly longer period of time in order to dispense a same amount of product to satisfy user demands. As such, the techniques and methodologies disclosed herein for optimizing a value of a dispensing parameter, such as motor run time, can be used to automatically adjust (e.g., increase) the motor run time in order to achieve a target performance outcome such as minimizing product usage per user. Measuring the value of the dispensing parameter (rather than using a pre-programmed value or a calculated value) may be appropriate in those scenarios in which a user prematurely halts a dispensing cycle and retrieves less than the predetermined amount of product such as, for example, when a user tears dispensed sheet product before the entire predetermined amount of sheet product is dispensed.

Still referring to the example embodiment introduced above, a second counter of an estimated number of unique users that received dispenses during the first dispensing period may also be maintained. In certain example embodiments, a predetermined period of time (e.g., 10 seconds) may be used to determine whether any two dispenses were triggered by the same user or different users. For example, if a given dispense occurred within the predetermined period of time of a previous dispense, the given dispense and previous dispense may be determined to have been triggered by the same user. Conversely, if two dispenses occurred more than the predetermined period of time apart from each other, they may be attributed to different users. In this manner, a second counter of the number of unique users that received dispenses during the first dispensing period may be maintained. As will be described in more detail later in this disclosure, the estimate of the number of unique users that used the dispenser during a dispensing period may be refined through the use of a confidence factor in order to arrive at a more accurate estimate of the actual number of users. The confidence factor may represent the approximate likelihood that two dispenses that occurred within the predetermined period of time are attributable to the same user and may be determined using one or more statistical techniques.

The final values of the first and second counters may then be stored at the completion of the first dispensing period. The occurrence of any of a variety of conditions may determine when a dispensing period ends. For example, a dispensing period may end when it is determined that a threshold number of unique users have received dispenses during the dispensing period. As another non-limiting example, a dispensing period may end after a threshold period of time has elapsed. As yet another example, a dispensing period may end after a threshold number of dispensing cycles have occurred. As used herein, a dispensing period need not be consecutive dispenses and may define only certain dispenses regardless of the time of those dispenses. For example, a dispensing period may be defined by a number of dispenses performed in accordance with a specific dispensing parameter value (e.g., to group all similar dispenses). Along these lines, however, some embodiments of the present invention are not limited to having a specific dispensing parameter, as some of the dispenses within a dispensing period may utilize different dispensing parameters. In this regard, an example dispensing period may have a majority of dispenses that occur at a specific dispensing parameter value.

At any time after the conclusion of the first dispensing period, a second dispensing period may be initiated. As previously noted, the first and second dispensing periods may be consecutive (e.g., the second dispensing period may immediately succeed the first dispensing period) or the first and second dispensing period may be non-consecutive (e.g., one or more other dispensing periods may occur between the first and second dispensing periods). In certain example embodiments, the first value of the dispensing parameter for the first dispensing period may be adjusted to obtain a second value of the dispensing parameter for the second dispensing period. If the first dispensing period is in fact the initial dispensing period associated with operation of the dispenser, the first value of the dispensing parameter may be increased or decreased based on a default setting in order to obtain the second value of the dispensing parameter for the second dispensing period. For example, in certain example embodiments, the initial value of the dispensing parameter may be decreased to obtain the second value of the dispensing parameter based on a default assumption that a reduction in the amount of product dispensed per dispensing cycle may result in a reduced overall usage per user for a dispensing period. For example, if an initial sheet length of 10 inches is dispensed for each dispensing cycle during the first dispensing period, the sheet length may be reduced to 9 inches for the subsequent second dispensing period.

As will be described in more detail hereinafter, the value of the dispensing parameter for a third dispensing period that occurs at some point after the second dispensing period may then be determined based on an evaluation of the relationship between the first value of the dispensing parameter during the first dispensing period and the second value of the dispensing parameter during the second dispensing period and the relationship between the aggregate usage per user during the first dispensing period and the aggregate usage per user during the second dispensing period. An adjustment to the dispensing parameter value for any given dispensing period subsequent to the third dispensing period may be similarly determined based on a relationship between the respective dispensing parameter values for any two prior dispensing periods and a relationship between the respective aggregate usages per user for the two prior dispensing periods.

In some embodiments, the above noted relationships could be determined using various algorithms or mathematical products to form comparisons. For example, the first value of the dispensing parameter may be multiplied by the usage rate (e.g., an amount of product per user, including rates such as inches per user, number of sheets of product per user, etc.) from the first dispensing period to form a first mathematical product. Likewise, the second value of the dispensing parameter may be multiplied by the usage rate from the second dispensing period to form a second mathematical product. Then, the first mathematical product and the second mathematical product could be compared to determine whether and how to change or adjust the value of the dispensing parameter.

Alternatively, some embodiments of the present invention contemplate other methods for determining an optimized dispensing parameter value. For example, the usage rate achieved during the first dispensing period by using the first value of the dispensing parameter may be compared against an "ideal" usage rate to determine whether and how to change or adjust the value of the dispensing parameter to achieve a usage rate that is closer to the ideal usage rate. In an example embodiment, the controller may be configured to attempt to optimize user convenience. For example, an average of 1.5 sheets/user for a paper towel dispenser might be the most convenient to users. If the controller calculates a low number of sheets per user (for example, 1.1 sheets/user), this might suggest that users wait longer than necessary for the dispenser to finish dispensing a towel. If the controller calculates a high number of sheets per user (for example, 1.8 sheets/user), this might suggest that users must request and wait for a second towel too often. Therefore, in an example embodiment, the dispensing parameter is sheet length and the controller may adjust sheet length to achieve an optimized number of sheets per user, for example 1.5 sheets/user. Though the above example uses a number of sheets per user usage rate, "usage rate" is not meant to be limited to a number of sheets per user. In this regard, "usage rate" may refer to an amount of product per user, which may include rates such as inches per user, number of sheets per user, etc.

As previously noted, in the case in which the first dispensing period is the initial dispensing period, the first value of the dispensing parameter may be adjusted (e.g., decreased) based on a default setting to obtain the second value of the dispensing parameter for the second dispensing period. If, on the other hand, the first dispensing period is some dispensing period subsequent to the initial dispensing period, the first value of the dispensing parameter may be increased or decreased to obtain the second value of the dispensing parameter for the second dispensing period based on a comparison of usage data associated with the first dispensing period and usage data associated with a previous (e.g., an immediately preceding) dispensing period, as will be described in more detail below.

In a similar manner as described above with respect to the first dispensing period, a first counter of the accumulated value of the dispensing parameter (e.g., the aggregate amount of product dispensed) during the second dispensing period may be maintained. For example, the first counter may represent the total amount of sheet product dispensed during the second dispensing period. In addition, a second counter of an estimated number of unique users that received dispenses during the second dispensing period may also be maintained. At any point after the conclusion of the second dispensing period, the second value of the dispensing parameter during the second dispensing period may be compared to the first value of the dispensing parameter during the first dispensing period. In addition, the aggregate amount of product dispensed per user (also referred to herein as accumulated value of the dispensing parameter, accumulated usage per user, aggregate usage per user, or usage data per user) during the first dispensing period may be compared to the aggregate amount of product dispensed per user during the second dispensing period. The nature of the adjustment made (if any) to a previous value of the dispensing parameter to obtain a third value of the dispensing parameter for a third dispensing period may be determined based on these comparisons.

While example embodiments of the disclosure discussed herein may describe an adjustment to the second value of the dispensing parameter during the second dispensing period to obtain the third value of the dispensing parameter for use during a third dispensing period, it should be appreciated that the results of comparing usage data for the first and second dispensing periods may be used to adjust any previous dispensing parameter value associated with any previous dispensing period in order to obtain the third value of the dispensing parameter for the third dispensing period. Further, as previously noted, the first and second dispensing periods may not be consecutive and/or may not immediately precede the third dispensing period, but rather may represent any two historical dispensing periods. As such, the first and second dispensing parameter values and the corresponding accumulated usage values may represent stored historical values corresponding to any prior dispensing periods.

In certain example embodiments, the first and second dispensing periods may be chosen based on user consumption patterns. For example, the first and second dispensing periods may represent non-consecutive dispensing periods that occur during approximately the same time of day on different days. As an example, user traffic patterns for an airport restroom may be starkly different Monday morning at 8 AM as compared to Wednesday evening at 8 PM. In such an example, first and second dispensing periods that occur Monday mornings on different weeks may be the most appropriate dispensing periods to select for comparison of usage data to obtain a third dispensing parameter value for a third dispensing period occurring Monday morning of some subsequent week. In other example embodiments, the first and second values of the dispensing parameter and the corresponding accumulated values may not correspond to particular first and second dispensing periods, but may instead represent average values for any number of prior dispensing periods, mode values across any number of prior dispensing periods, median values across any number of dispensing periods, or the like. In certain example embodiments, dispensing data for other product dispensers (e.g., dispensing parameter values, accumulated values, etc.) may be used to optimize a dispensing parameter value for a product dispenser. For example, usage data from two or more product dispensers (e.g., two proximately located product dispensers) may be utilized to optimize a dispensing parameter value for one or more of the product dispensers.

In yet further example embodiments, different datasets of dispensing data may be maintained and independently optimized based, for example, on different user consumption patterns. For example, a first product dispenser may be located in a high-traffic area that experiences steady user traffic throughout the day, whereas a second product dispenser may be located in an area that experiences relatively low user traffic throughout the day except for limited spikes in user activity (e.g., in the morning, during lunchtime, etc.). For the second product dispenser, a first dataset may be maintained for dispensing periods that coincide with the spikes in user activity and a second dataset may be maintained for dispensing periods that coincide with the low levels of user activity, where the first dataset includes dispensing parameter values that are optimized independently of dispensing parameter values included in the second dataset.

Other example scenarios in which separate datasets of dispensing parameter values may be maintained and independently optimized may involve differences in characteristics of users during different dispensing periods. For example, users of a product dispenser located in a primary school may be more likely to be adults (e.g., visitors, staff, etc.) during class hours, whereas users between class hours may be more likely to be children. Adults and children may exhibit different use characteristics. For example, children may generally consume less product due to the smaller size of their hands. As another example, adults may have more of an incentive to minimize product consumption based on a desire to conserve and prevent waste. As such, an optimization process described herein may optimize a dispensing parameter value for a dispensing period during class hours based on a first dataset of dispensing parameter values for dispensing periods that coincide with class hour time periods and may optimize the dispensing parameter value for a dispensing period between class hours based on a second dataset of dispensing parameter values for dispensing periods that coincide with time periods between class hours.

It should be appreciated that the above examples are merely illustrative and not exhaustive. In this regard, additional or different external factor data can be used to distinguish users or groups of users to determine an optimized dispensing parameter value for that specific user or group of users. Any additional ability of the product dispenser to separate users into multiple categories can help to optimize dispensing parameters further, since that gives the dispensing parameters opportunities to depart from a single optimized value towards multiple values more optimized for particular users or groups. For example, embodiments of the present invention contemplate using external factor data comprising at least one of time range data associated with the plurality of dispenses, characteristic hand data associated with activation of a sensor for the plurality of dispenses, motion direction data associated with activation of a sensor for the plurality of dispenses, optical data associated with the plurality of dispenses, audio data associated with the plurality of dispenses, biological user data associated with the plurality of dispenses, or user identification data associated with the plurality of dispenses. The following provides example embodiments in accordance these concepts.

In an example embodiment, the product dispenser detects a user's hand, detects the approximate size of the user's hand, and determines if the user's hand size is less than a threshold size. The controller aggregates a first set of usage data for users with hand sizes below the threshold, and a second set of usage data for users with hand sizes above the threshold. Further, the controller determines a first optimized dispensing parameter for the user group with hand sizes below the threshold, and a second optimized dispensing parameter for the user group with hand sizes above the threshold.

In another example embodiment, the product dispenser detects a user's hand, detects the direction of motion of the user's hand, and determines if the user's motion is in a certain direction. The controller aggregates a first set of usage data for users with motion in that certain direction, and a second set of usage data for users with motion that is not in that certain direction. Further, the controller determines a first optimized dispensing parameter for the user group with motion in that certain direction, and a second optimized dispensing parameter for the user group with motion that is in that certain direction.

Further example embodiments contemplate categorizing users into different groups that may include, but are not limited to, the controller identifying infrared signatures, shirt color, audible cues or commands.

Depending on the configuration, the dispenser controller may be able to distinguish users well enough to categorize each user as his/her own group, and thereby optimize a dispensing parameter for individual users. For example, a user may swipe a badge to command the dispenser to dispense a towel. The controller may assign that badge number's usage data (without knowing the identity of the user) and find an optimized dispensing parameter to utilize whenever that particular badge is swiped. As such, the dispenser dispenses a custom sheet length to each user that is optimized to reduce usage for each individual's behavior and preferences.

Further example embodiments contemplate methods of distinguishing individual users into different user groups by identifying vein prints, finger prints, retinal scans, voice commands, etc.

Retelling again to example embodiments in which the second dispensing parameter value is adjusted to obtain the third dispensing parameter value, if the second dispensing parameter value is less than the first dispensing parameter value and the aggregate usage per user for the second dispensing period is less than the aggregate usage per user for the first dispensing period, the second dispensing parameter value may be decreased to obtain the third dispensing parameter value. The decrease in the second dispensing parameter value to obtain the third dispensing parameter value may be based on: i) the fact that a decrease in the dispensing parameter value from the first dispensing period to the second dispensing period resulted in a decreased overall usage per user for the second dispensing period as compared to the first dispensing period and ii) an assumption that a further decrease in the dispensing parameter value may result in a further decrease in the overall usage per user for the third dispensing period.

On the other hand, if the second dispensing parameter value is less than the first dispensing parameter value and the aggregate usage per user for the second dispensing period is greater than the aggregate usage per user for the first dispensing period, the second dispensing parameter value may be increased to obtain the third dispensing parameter value. The increase in the second dispensing parameter value to obtain the third dispensing parameter value may be based on: i) the fact that a decrease in the dispensing parameter value from the first dispensing period to the second dispensing period resulted in an increased overall usage per user for the second dispensing period as compared to the first dispensing period and ii) an assumption that an increase in the second dispensing parameter value may result in a decrease in the overall usage per user for the third dispensing period as compared to the second dispensing period. In this scenario, the dispensing parameter may be increased to a third value that is greater than the second dispensing parameter value but less than the first dispensing parameter value based on an assumption that an intermediate value between the first dispensing parameter value and the second dispensing parameter value may result in reduced overall usage per user for the third dispensing period as compared to the first dispensing period. For example, to obtain the third dispensing parameter value, the second dispensing parameter value may be increased to a value that is more than halfway between the second dispensing parameter value and the first dispensing parameter value. In certain example embodiments, however, the second dispensing parameter value may be increased to a value that is equal to or greater than the first dispensing parameter value in order to obtain the third dispensing parameter value. This may occur, for example, if the first dispensing period is the initial dispensing period or a relatively early dispensing period in the optimization process. This may also occur if the incremental amount by which the dispensing parameter value is adjusted is small enough to not, in and of itself, cause a significant disturbance to user behavior.

In other scenarios, the second dispensing parameter value may be greater than the first dispensing parameter value. In such scenarios, if the aggregate usage per user during the second dispensing period increased as compared to the aggregate usage per user during the first dispensing period, the second dispensing parameter value may be decreased to obtain the third dispensing parameter value. The decrease in the second dispensing parameter value to obtain the third dispensing parameter value may be based on: i) the fact that an increase in the dispensing parameter value from the first dispensing period to the second dispensing period resulted in an increased overall usage per user for the second dispensing period as compared to the first dispensing period and ii) an assumption that a decrease in the dispensing parameter value may result in a decrease in the overall usage per user for the third dispensing period as compared to the second dispensing period. In this scenario, the dispensing parameter may be decreased to a third value that is less than the second dispensing parameter value but greater than the first dispensing parameter value based on an assumption that an intermediate value between the first dispensing parameter value and the second dispensing parameter value may result in reduced overall usage per user for the third dispensing period as compared to the first dispensing period. In certain example embodiments, however, the third dispensing parameter value may be equal to or less than the first dispensing parameter value. This may occur if, for example, the first dispensing period is the initial dispensing period or a relatively early dispensing period in the optimization process. This may also occur, as similarly noted above, if the incremental amount by which the dispensing parameter value is adjusted is small enough to not, in and of itself, cause a significant disturbance to user behavior.

If, on the other hand, the second dispensing parameter value is greater than the first dispensing parameter value and the aggregate usage per user during the second dispensing period decreased as compared to the aggregate usage per user during the first dispensing period, the second dispensing parameter value may be increased to obtain the third dispensing parameter value. The increase in the second dispensing parameter value to obtain the third dispensing parameter value may be based on: i) the fact that an increase in the dispensing parameter value from the first dispensing period to the second dispensing period resulted in a decreased overall usage per user for the second dispensing period as compared to the first dispensing period and ii) an assumption that a further increase in the dispensing parameter value may result in a further decrease in the overall usage per user for the third dispensing period as compared to the first dispensing period.

The various relationships that may exist between the first dispensing parameter value and the second dispensing parameter value and the various relationships that may exist between the aggregate usage per user for the first dispensing period and the aggregate usage per user for the second dispensing period as well as the corresponding adjustments that may be made to the second dispensing parameter value to obtain the third dispensing parameter value are shown in Table 1.

TABLE 1

| Second dispensing parameter value > first dispensing parameter value | Aggregate usage per user for second dispensing period > aggregate usage per user for first dispensing period | Adjustment made to second dispensing parameter value to obtain third dispensing parameter value |
|---|---|---|
| No | No | Decrease |
| No | Yes | Increase |
| Yes | No | Increase |
| Yes | Yes | Decrease |

After determining the appropriate adjustment to be made to the second dispensing parameter value to obtain the third dispensing parameter value, dispensing cycles that occur during the third dispensing period may utilize the third dispensing parameter value. Upon completion of the third dispensing period, a similar process to that described above may be performed to determine the nature of the adjustment to be made to the third dispensing parameter value (or some other dispensing parameter value associated with some other previous dispensing period) to obtain a fourth dispensing value for a fourth dispensing period that succeeds the third dispensing period. The process may then be repeated iteratively in perpetuity, or alternatively for any number of dispensing periods until an optimized value or optimized range of values for the dispensing parameter is reached. In such a regard, some embodiments of the present invention describe obtaining "improved" values in an effort to ultimately find an "optimized" value. Regardless, some embodiments of the present invention use improved and optimized interchangeably, such that an optimized value may, in some cases, be an improved value. In certain example embodiments, the optimization process may be repeated until a difference in aggregate usage per user between successive dispensing periods is within a predetermined threshold. In other example embodiments, the dispensing parameter value may be iteratively adjusted until no change in the aggregate usage per user is observed for some threshold number of iterations. In other example embodiments, the dispensing parameter value may be iteratively adjusted as long as the dispenser is operational.

In some embodiments, the new determined optimized value of the dispensing parameter may be checked against a bounded value threshold to ensure that an inappropriate (or less desirable) result is not reached by the optimization method. In this regard, by setting the value of the dispensing parameter to the determined optimized value of the dispensing parameter, the result may be undesirable for the corresponding dispensing parameter. For example, it may be desirable to bound a dispensing parameter of sheet length by a minimum sheet length. In this example, if the determined optimized value of the dispensing parameter resulted in a sheet length being less than the minimum sheet length, than that determined optimized value of the dispensing parameter would not be used. In such a scenario, the optimization method may be repeated to determine a different optimized value or another optimized value may be determined outright. In some embodiments, a range of bounded value thresholds may be applied to ensure that a dispensing parameter stays within that range (e.g., a range of possible sheet lengths).

In some embodiments, it may be desirable to bound the optimized value of the first dispensing parameter based on a value of a second different dispensing parameter. In such a circumstance, the value of the second dispensing parameter may be checked against a bounded threshold value to ensure that an appropriate result occurs when using the optimized value of the first dispensing parameter. For example, the first dispensing parameter may be sheet length and the second dispensing parameter may be average number of sheets per user. In such a scenario, if the sheet length is low enough, the usage rate may be optimized, but the average number of sheets per user may be too high—thereby making the end result undesirable.

In some embodiments, the second dispensing parameter may be determined based on prior usage data. For example, a second dispensing parameter value can be determined based on the dispensing period (e.g., the value of the second dispensing parameter as observed during the dispensing period).

In some embodiments, the value of the second dispensing parameter could be based on the optimized value of the first dispensing parameter. For example, dispensing with the product dispenser in accordance with the optimized value of a first dispensing parameter may result in a value of a second dispensing parameter. Such a value of a second dispensing parameter may be determined through theoretical testing or actual testing of operation of the product dispenser in accordance with the optimized value of the first dispensing parameter.

In some embodiments, theoretical testing may comprise using historical relations or data to predict what the value of the second dispensing parameter would be if the dispenser were to operate using the optimized value of the first dispensing parameter (e.g., creating a theoretical test). Such a theoretical test could be accomplished using a controller (e.g., from the dispenser or server).

In some embodiments, actual testing can be performed to determine the value of the second dispensing parameter. In such embodiments, the dispenser(s) could operate in accordance with the optimized value of the first dispensing parameter for one or more cycles (e.g., a test period). Then, the value of the second dispensing parameter could be observed and used as the value of the second parameter for checking against the bounded value threshold.

The above noted embodiments regarding bounding the optimization method may be applied to any number of examples in product dispensers. The following provides some examples of how bounding can be applied to avoid undesirable results from an optimization method.

In one example, if the sheet length of a paper towel dispenser is short enough, users may become overly frustrated with taking too many sheets, spending too much time drying hands, or thinking that the product dispenser is malfunctioning. To minimize these potential frustrations, the controller may determine an alternative value of sheet length. For example, the controller may identify a minimum acceptable sheet length (for example 8") and cause the dispensing mechanism to dispense at least the minimum acceptable sheet length when a user commands a dispense, even if the controller determines that an optimized sheet length for usage reduction is less than 8". In another example, the controller may determine an average number of sheets per user. If the number exceeds a maximum acceptable amount (for example, 1.8 sheets/user) that represents unacceptable inconvenience to the user, then the controller may cause the dispensing mechanism to increase sheet length to help alleviate the inconvenience, even if the controller determines that an optimized sheet length for usage reduction causes more than 1.8 sheets/user.

In a second example, if the sheet length of a paper towel dispenser is too long, users may become frustrated if the dispensed towel contacts a wet countertop, if the towel takes too long to dispense, etc. To minimize these potential frustrations, the controller may determine an alternative value of sheet length. For example, the controller may identify a maximum acceptable sheet length (for example 18") and cause the dispensing mechanism to dispense no more than the maximum acceptable sheet length when a user commands a dispense, even if the controller determines that an optimized sheet length for usage reduction is more than 18". In another example, the controller may determine an average number of sheets per user. If the number is less than a minimum acceptable amount (for example, 1.1 sheets/user) that represents unacceptable inconvenience to the user, then the controller may cause the dispensing mechanism to reduce sheet length to help alleviate the inconvenience, even if the controller determines that an optimized sheet length for usage reduction causes less than 1.1 sheets/user.

In some example embodiments, the bounded value threshold may be determined. In this regard, the bounded value threshold may be determined to account for any number of factors, such as user frustration. Moreover, such a determination for the bounded value threshold could be made based on observed user frustration trends during the dispensing period—thereby making a dynamic determination that is tailored to the users of that product dispenser. Additionally or alternatively, the user frustration could be determined based on observed user frustration during manufacturing or other testing. To explain, collected data indicates that many users are frustrated with shorter sheet lengths, but fail to take the additional sheets of product that would cause the optimization method to achieve an appropriate optimized dispensing parameter. In this regard, the usage data may not accurately be representing the user's desires. Thus, example embodiments of the present invention seek to monitor user frustration and modify the usage data to account for that user frustration. In this regard, the modified usage data could be used to determine a more accurate optimized dispensing parameter.

In an example embodiment, a curve tracking the average length of product per use can be monitored during the dispensing period. Notably, a change in the slope of that curve may reveal occurrence of user frustration during the dispensing period—thereby affecting the accuracy of the usage data with respect to a user's true desires. That change in slope can then be used to form modified usage data that could be used in the optimization algorithm to achieve a more accurate optimized value for the dispensing parameter.

Figure 8:
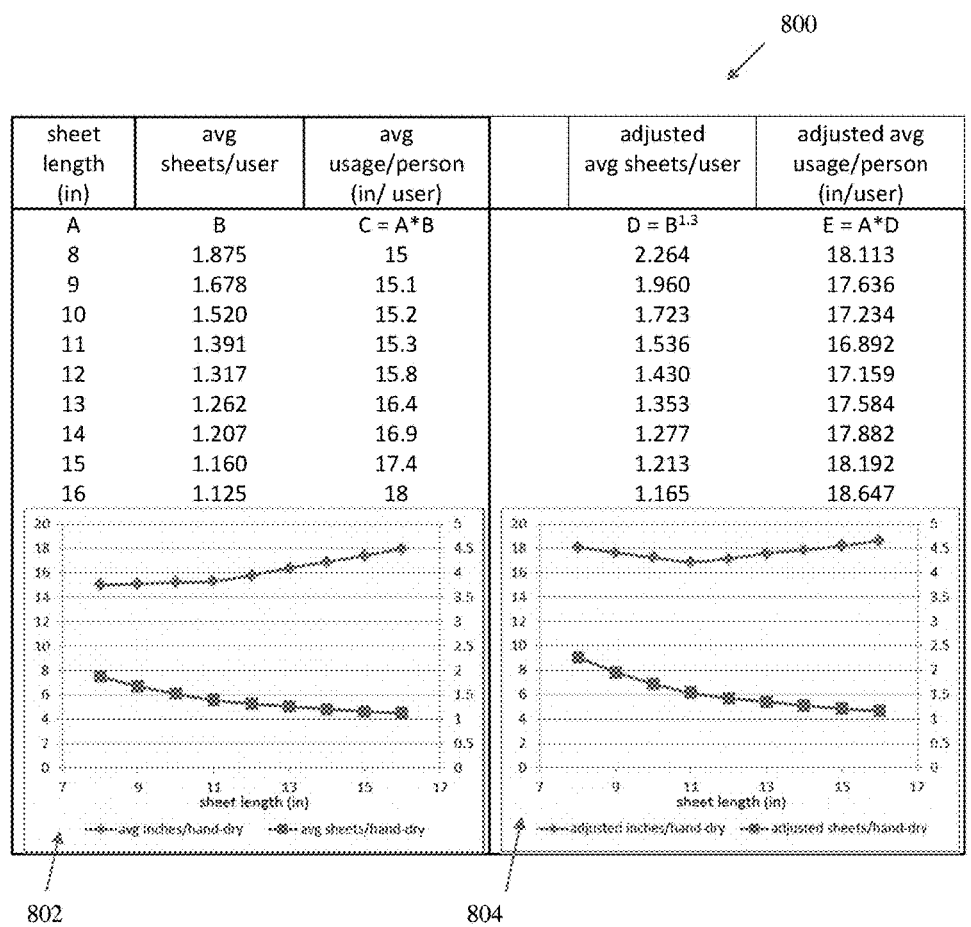
FIG. 8 shows a data table and two graphs in accordance with one or more example embodiments of the disclosure.

For example, FIG. 8 below depicts example data table 800 and graphs 802, 804 to help show unmodified usage data (that doesn't attempt to account for user frustration) and modified usage data (that does attempt to account for user frustration). The first three columns (A, B, C) of FIG. 8 show that the percentage decrease in sheet length is greater than any associated increase in the number of sheets/user. Therefore, the data in columns A-C may drive an optimization method to arrive at a minimum sheet length (if bounded to the minimum sheet length)—in this case 8". To explain, an example optimization method may look to optimize sheet length using product usage per user. In such a scenario, there may be an assumption that users will take more sheets per use if a sheet length is considered (by the user) to be too short. Under this assumption, if there is a larger percentage decrease in sheet length than increase in the number of sheets per user, then the optimization method will assume that it is on the right track by decreasing the sheet length to a minimum level. This is because the average product usage per user has decreased. As noted above however, users may get frustrated and, thus, not actually act according to the assumption thereby providing an undesirable result using such an optimization method.

The left graph 802 in FIG. 8 shows that the usage data (blue curve) has an increase (or change) in slope at a sheet length of approximately 11", although the slope always remains positive. This suggests that even though usage is optimized at the minimum sheet length, that user behavior becomes more responsive below a sheet length of 11". This could potentially suggest that user frustration becomes unacceptable, or at least detectable, at lengths below 11", and that the optimization algorithm should reduce sheet length no shorter than 11" to minimize usage.

The fourth and fifth columns (D, E) of FIG. 8 show a mathematical way to detect the potential onset of user frustration. Column D raises Column B to a certain power, in this case the exponent of 1.3, resulting in adjusted values of the average number of sheets a person takes (e.g., a modified usage rate). Column E multiplies the actual sheet length by the adjusted number of sheets to obtain an adjusted usage per person (e.g., a modified usage rate). The values in Columns D and E are inflated compared to reality, but are more representative of user behavior. The adjusted usage per person is shown as the blue curve in the right graph 804 of FIG. 8. This curve reveals a dip (or low point) in the usage curve at a sheet length of 11". Therefore, the optimization algorithm can use the data in Columns D and/or E to identify the sheet length that offers a compromise of automatically reducing consumption without causing unnecessary user frustration.

The value of the exponent in Column D may be determined in a variety of ways. One example way is to study user behavior and identify characteristics in the unadjusted usage curves that identify the onset of user frustration, and then identify an exponent value or range of values that properly converts the unadjusted usage curves into adjusted curves that the optimization algorithm can use to offer a valuable compromise between reducing consumption without unnecessary user frustration.

Though the above example includes using an exponent to modify the usage data, example embodiments of the present invention contemplate many other mathematical constructions that offer equivalent manners of identifying characteristics of usage curves (slopes, inflection points, etc.) that provide user signals and help the algorithm determine sheet length or other dispensing parameters that offer improved dispenser performance.

In some embodiments, the bounded value threshold may be determined by a user, such as with a switch on the product dispenser. For example, the switch may be set to various ranges of values for a dispensing parameter (e.g., sheet lengths). Similarly, the switch may be used to differentiate between fixed sheet length values and a possible range of values used for optimization methods. As used herein, "switch" may refer to a sliding switch, a rotary dial, a capacitive pad, or any suitable manner of selecting at least one of multiple operating modes. The following provides some examples of embodiments regarding switches for using with example product dispensers described herein.

In an example embodiment, the product dispenser includes a sheet length switch that allows the property manager or janitor to choose between fixed length towels or optimized length towels. For example, the switch may be a 3-position switch for which 2 positions generate fixed length towels and 1 position generates an optimized length towel. A sheet length switch may be labeled "M-L-Auto", causing the dispenser to dispense a medium towel (approximately 12" length), a long towel (approximately 16" length), or a towel length within a convenient range that the product dispenser automatically determines in order to reduce usage (within a range between 8" to 16"). In this manner, the same product dispenser may be provided to numerous environments while enabling various customers to control their sheet length preferences.

In another example embodiment, the product dispenser includes a sheet length switch with 3 positions, each with a different sheet length range, for example "S-M-L", and the controller may optimize the sheet length within each setting range. For example, a switch placed in the "S" position may cause the dispenser to optimize sheet length within a range of 8" to 11", the switch placed in the "M" position may cause the dispenser to optimize sheet length within a range of 11" to 14", and the switch placed in the "L" position may cause the dispenser to optimize sheet length within a range of 14" to 18". In this manner, the property manager may attain some degree of usage reduction due to automatic sheet length optimization, while still retaining some control over sheet length.

In another example embodiment, the product dispenser includes a sheet length switch with 3 positions. The first position may cause the controller to dispense a fixed sheet length, for example 12". The second position may cause the controller to dispense a sheet length between 8" to 16" that optimizes usage reduction. The third position may cause the controller to dispense a sheet length between 8" to 16" that optimizes user convenience, for example 1.5 sheets/user. As such, some example embodiments provide the ability to the user to choose what dispensing parameter is optimized.

In this regard, it is within the scope of example embodiments of this invention to combine any number of switch settings, or the dispensing parameter that is adjusted, or the limits or bounds placed on the dispensing parameter.

The amount by which the value of the dispensing parameter for a current dispensing period may be adjusted to obtain a value of the dispensing parameter for a successive dispensing period may depend on the number of iterations of the optimization process that have been performed. For example, during early iterations in the optimization process, the dispensing parameter value may be adjusted in larger increments from one dispensing period to the next dispensing period as compared to later iterations in the optimization process. Referring, solely for explanatory purposes, to an example embodiment in which the dispensing parameter is dispense duration, if we assume that the initial value of the dispensing parameter for the first dispensing period is 5 seconds (where the first dispensing period represents the initial dispensing period at a starting point of the optimization process) and the dispense duration is decremented to 4 seconds for the second dispensing period based, for example, on a default setting, and we further assume that the aggregate usage per user during the second dispensing period is less than the aggregate usage per user during the first dispensing period, then the second dispensing parameter value may be further decremented by 1 second to obtain a third dispensing parameter value of 3 seconds for a third dispensing period. If the aggregate usage per user decreases for the third dispensing period as well, and as long as the aggregate usage per user continues to decrease for subsequent dispensing periods, the dispensing parameter value may be adjusted by the same incremental amount. When, however, the aggregate usage per user actually increases during a particular dispensing period as compared to a previous (e.g., immediately preceding) dispensing period, the value of the dispensing parameter for the particular dispensing period may be increased by a smaller amount (e.g., less than 1 second) to obtain the dispensing parameter value for the next dispensing period. The optimization process may continue in this manner such that each time the aggregate usage per user increases for a given dispensing period as compared to a previous dispensing period the dispensing parameter value is adjusted by a smaller increment for a subsequent dispensing period. In this manner, an optimized dispensing parameter value or an optimized range of dispensing parameter values may be obtained.

In one or more alternative example embodiments, the amount by which the value of the dispensing parameter is adjusted from one dispensing period to the next may be constant. This would allow meaningful adjustments to be made to the dispensing parameter value even after numerous dispensing periods, in the event that a significant change to user behavior or other dispensing conditions occurs. For example, after the optimization process has achieved an optimized value for a dispensing parameter, a different type of sheet product roll having different absorbency properties than previous rolls may be installed in a product dispenser. Due to its different absorbency properties, a different optimized value of the dispensing parameter may be associated with the different type of sheet product roll. Accordingly, in such example scenarios, more substantial adjustments to the value of the dispensing parameter (e.g., incrementing or decrementing by a constant value) may need to be made as part of the optimization process even if the dispensing parameter value had been previously optimized under different conditions. An additional example relating to decreasing battery voltage over time is described later in this disclosure.

It should be appreciated that, in certain example embodiments, certain dispensing parameters may be susceptible to more granular adjustment than other dispensing parameters. For example, it may be possible to adjust (e.g., increase or decrease) a dispense duration by X milliseconds. However, a sheet length, for example, may be adjustable in less granular increments/decrements such as 1 inch depending upon hardware, software, firmware, and/or other specifications or configurations of a product dispenser. Further, in certain example embodiments, a particular dispensing parameter may serve to accomplish the same result as another dispensing parameter. For example, using dispense duration as a dispensing parameter and optimizing a dispense duration may serve to optimize a sheet length dispensing parameter because the objective of optimizing either dispensing parameter may be to reduce aggregate usage per user. If dispensing duration is used as a dispensing parameter, changes in voltage from a power source (e.g., a decrease in battery voltage) may cause a lesser amount of product to be dispensed over time for a given dispensing duration. However, if the reduction in the amount of product dispensed were to cause the aggregate usage per user to increase, iterations of the optimization process would result in an adjustment to the dispensing parameter that increases the dispense duration in order to once again arrive at an optimum value or range of values for the dispensing duration.

In certain example embodiments, any number of different dispensing parameters that serve as proxies for a product amount may be optimized. Such dispensing parameters that may operate as proxies for a product amount include, but are not limited to, product sheet length, product volume, dispense duration, soap concentration, product weight, product area, wet wipe moisture concentration, or the like. For certain dispensing parameter proxies (e.g., product sheet length), the correlation between the dispensing parameter proxy and product amount may remain relatively constant through the life-cycle of the product dispenser, while for other dispensing parameter proxies (e.g., dispense duration), the correlation may change over time. However, as described above with respect to dispense duration, optimization processes described herein may be used to optimize the dispensing parameter proxy (and thus product amount) despite changes in the correlation between the dispensing parameter proxy and product amount.

In certain example embodiments, an adjustment in the first dispensing parameter value to obtain the second dispensing parameter value may result in no change in the aggregate usage per user. In such example embodiments, the second dispensing parameter value may nonetheless be increased or decreased to obtain a third dispensing parameter value for a third dispensing period subsequent to the second dispensing period. For example, in those example embodiments, in which the aggregate usage per user is unchanged from the first dispensing period to the second dispensing period, the direction in which the second dispensing parameter value is adjusted (e.g., whether the second dispensing parameter value is increased or decreased to obtain the third dispensing parameter value) may be the same as a direction in which the first dispensing parameter value was adjusted to obtain the second dispensing parameter value. For example, if the first dispensing parameter value was increased to obtain the second dispensing parameter value, then the second dispensing parameter value may be increased to obtain the third dispensing parameter value despite the lack of change in aggregate usage per user from the first dispensing period to the second dispensing period. Based on similar algorithmic logic, if the first dispensing parameter value was decreased to obtain the second dispensing parameter value, then the second dispensing parameter value may be decreased to obtain the third dispensing parameter value despite the lack of change in aggregate usage per user from the first dispensing period to the second dispensing period.

More specifically, assuming that the first dispensing period is not the initial dispensing period, the first dispensing parameter value may have been increased to obtain the second dispensing parameter value in either of two scenarios: 1) a scenario in which a prior dispensing value for a dispensing period prior to the first dispensing period was decreased to obtain the first dispensing parameter value and this resulted in an increase in aggregate usage per user for the first dispensing period or 2) a scenario in which the prior dispensing value for the prior dispensing period was increased to obtain the first dispensing parameter value and this resulted in a decrease in the aggregate usage per user for the first dispensing period. Similarly, the first dispensing parameter value may have been decreased to obtain the second dispensing parameter value in either of two scenarios: 1) a scenario in which the prior dispensing value was increased to obtain the first dispensing parameter value and this resulted in an increase in aggregate usage per user for the first dispensing period or 2) a scenario in which the prior dispensing value for the prior dispensing period was decreased to obtain the first dispensing parameter value and this resulted in a decrease in the aggregate usage per user for the first dispensing period. In any of these scenarios, if the increase or decrease in the first dispensing parameter value to obtain the second dispensing parameter value results in no change in the aggregate usage per user, then the second dispensing parameter value may be adjusted to obtain the third dispensing parameter value in the same direction as the adjustment to the first dispensing parameter value to obtain the second dispensing parameter value.

The example dispensing parameter of dispense duration will now be used to explain the algorithmic logic described above. Assume that the prior dispensing parameter value is 3 seconds and that this value was decreased to 2 seconds to obtain the first dispensing parameter value. If this resulted in an increase in aggregate usage per user, it may indicate that the increase in the amount of product used as a result of one or more users requesting multiple dispenses at the 2 second dispense duration who would not have requested multiple dispenses at the 3 second dispense duration exceeds the reduction in the amount of product used by other users as a result of the decrease in the dispense duration from 3 seconds to 2 seconds. As such, the first dispensing parameter value of 2 seconds may be increased to, for example, 2.5 seconds for the second dispensing parameter value. If this increase results in no change in the aggregate usage per user, it may be assumed that a further increase in the dispense duration may cause a decrease in aggregate usage per user, since aggregate usage per user was less with a 3 second dispense duration than with either a 2 second dispense duration or a 2.5 second dispense duration. As such, the second dispensing parameter value of 2.5 seconds may be increased to obtain the third dispensing parameter value. Thus, the direction of the adjustment of the second dispensing parameter value to obtain the third dispensing parameter value may be the same as the direction of the adjustment of the prior dispensing parameter value to obtain the first dispensing parameter value despite a lack of change in aggregate usage per user between the first dispensing period and the second dispensing period. Similar algorithmic logic may be applied to the other scenarios described above.

While example embodiments of the disclosure may be described herein in connection with storing an accumulated/aggregate dispensing parameter value for a dispensing period in a first counter, storing a number of unique users during the dispensing period in a second counter, and determining a usage rate for the dispensing period as a ratio the first counter to the second counter, it should be appreciated that the usage rate for a dispensing period may be determined in a variety of alternative ways without departing from the scope of the disclosure. For example, in certain example embodiments, a "running average" or the like of the usage rate may be maintained throughout the dispensing period without explicitly maintaining the accumulated/aggregate value of a dispensing parameter in a first counter and/or the number of unique users in a second counter. The running average may be updated as each dispensing cycle of the dispensing period occurs. In addition, while in certain example embodiments, a set value of the dispensing parameter may be used to adjust the accumulated value (or the running average) with each dispensing cycle, in other example embodiments, a measured value of the dispensing parameter may be used. It should further be appreciated that the terms accumulated and aggregate may be used interchangeably herein.

Retelling now to other aspects of example optimization processes described herein, a counter of the estimated number of unique users may be maintained for each dispensing period, as previously described. For example, a predetermined period of time may be used to distinguish dispenses received by a same user from dispenses received by different users. More specifically, two dispenses that occur more than a threshold period of time apart from one another may be assumed to have been dispensed to different users, while a dispense that occurred within the threshold period of time from another dispense may be assumed to have been dispensed to the same user.

Occurrence of a dispense may refer to a time at which a dispense signal was generated, a time at which an actuation signal for actuating a dispensing mechanism is generated by a controller or received by the dispensing mechanism, a time at which a dispensing cycle is initiated, a time at which a dispensing cycle is completed, or any time during a dispensing cycle. More specifically, the threshold period of time between dispenses may be determined in a variety of ways. For example, the threshold period of time may be a time period between i) generation of a first actuation signal by the controller or receipt of the first actuation signal by the dispensing mechanism and ii) generation of a second subsequent actuation signal by the controller or receipt of the second actuation signal by the dispensing mechanism. Alternatively, the threshold period of time for distinguishing dispenses that occur to a same user or different users may be a time period between receipt of a first signal from a user sensor or a tear sensor and receipt of a second subsequent signal from the user sensor or tear sensor. In still other example embodiments, the threshold period of time may be a time period between completion of a first dispensing cycle (e.g., completion of a first motor run) and receipt or generation of a user sensor signal, tear sensor signal, or actuation signal (or initiation of a second motor run) corresponding to a second subsequent dispensing cycle. Thus, the threshold period of time may be measured between the occurrence/detection of like events (e.g., successive activations of a tear sensor of a product dispenser) or disparate events (e.g., a first activation of a tear sensor and generation of an actuation signal in connection with a subsequent activation of the tear sensor). Further, while a period of time of 10 seconds may be described herein as the predetermined period of time solely for ease of explanation, this should not be deemed limiting in any way. Rather, the predetermined period of time used to determine whether multiple dispenses should be attributed to the same user or different users may be any suitable period of time (e.g., 6 seconds, 8 seconds, 12 seconds, etc.). In particular, as will be described in more detail later in this disclosure, the predetermined period of time may be chosen to be a time period that corresponds to a minimum desired confidence factor. For example, a shorter predetermined period of time may be chosen as the number of estimated users per hour increases. Alternatively, as will be described in more detail later in this disclosure, the predetermined period of time may be constant, and the confidence factor may be updated as traffic patterns and usage change.

Some embodiments of the present invention may utilize other information in addition to (or instead of) time to determine or differentiate users during a dispensing period. For example, external factor data such as at least one of characteristic hand data associated with activation of a sensor for the plurality of dispenses, motion direction data associated with activation of a sensor for the plurality of dispenses, optical data associated with the plurality of dispenses, audio data associated with the plurality of dispenses, biological user data associated with the plurality of dispenses, or user identification data associated with the plurality of dispenses could be utilized to determine or differentiate users. The following provides example embodiments in accordance with this concept.

In an example embodiment, the product dispenser may comprise a color detector that can identify a color associated with a user, for example a shirt color. If a dispense command associated with a green shirt occurs within 10 seconds of a dispense command associated with a white shirt, the controller may calculate usage based upon 2 users instead of a single user. Conversely, if a dispense command associated with a green shirt occurs more than 10 seconds after a dispense command associated with a green shirt, the controller may calculate usage based upon a single user instead of 2 users. Such example embodiments take into account both a color detector and a time component when distinguishing users.

In another example embodiment, the product dispenser may comprise a badge reader that can identify a unique number associated with a user. If a dispense command associated with a certain number occurs within 10 seconds of another dispense command associated with a different number, the controller may calculate usage based upon 2 users instead of a single user. Conversely, if a dispense command associated with a certain number occurs more than 10 seconds after a dispense command associated with that number, the controller may calculate usage based upon a single user instead of 2 users.

Further example embodiments contemplate methods of distinguishing unique users from different users by identifying hand size, hand motion, infrared signatures, audible cues, voice commands, vein prints, finger prints, retinal scans, etc.

In certain example embodiments of the disclosure, estimating a number of unique users based solely on whether dispenses occurred within or outside of a predetermined period of time may result in inaccurate estimates. For example, the possibility exists that two users may each request a product within the 10 seconds of each other. This possibility becomes increasing more likely as user traffic increases and more individuals approach a product dispenser within 10 seconds of each user. Thus, as user traffic increases, the capability to distinguish a number of unique users diminishes, resulting in increasingly inaccurate aggregate usage per user calculations. This in turn compromises the ability to arrive at an optimized value for a dispensing parameter.

In order to counteract the effects of increased user traffic noted above, the estimate of the number of users may be statistically refined for any given dispensing period. A confidence factor may be determined for a given set of usage data. In certain example embodiments, the usage data may be simulated usage data. As previously mentioned, the confidence factor may represent an approximate probability that two dispenses that occurred within the threshold period of time were to the same user. The confidence factor may be determined using any suitable statistical approach. An example statistical approach will be described in more detail in reference to FIGS. 5A-5B later in this disclosure. In certain example embodiments, the confidence factor may be determined as a function of an estimated number of unique users over some period of time (e.g., an hour).

It should be appreciated that, in certain example embodiments, the amount of time required to complete a dispensing cycle may represent a floor for the threshold period of time used to distinguish dispenses occurring to the same user from dispenses occurring to different users. For example, in the case of a "hang-mode" product dispenser, upon activation of the tear sensor, a certain period of time (e.g., 4-6 seconds) may be required for the tear sensor to signal the controller, the controller to generate an actuation signal to actuate the dispensing mechanism, and the dispensing mechanism to dispense an amount of product. Accordingly, any threshold period of time used to distinguish dispenses occurring to the same user or different users may need to account for this minimum period of time required to complete a dispensing cycle in order to yield a suitable estimate for the number of unique users that receive dispenses. The threshold period of time may be chosen to account for other factors as well such as, for example, variance in user behavior, user traffic patterns, and so forth. For example, users may vary in the amount of time taken between triggering multiple dispenses, user traffic may affect the amount of time needed for a user to leave the vicinity of the dispenser and another user to approach the vicinity of the dispenser, and so forth.

In certain example embodiments, an initial estimate of the number of unique users over a period of time (e.g., over the course of a dispensing period) may be determined. More specifically, a first number of dispenses, each of which did not occur within, for example, 10 seconds of any other dispense, may be determined. The first number of dispenses may equal a first estimated number of unique users. A second number of dispenses may then be determined. Each dispense in the second number of dispenses may have occurred within, for example, 10 seconds of at least one other dispense in the second number of dispenses. The second number of dispenses may then be divided by two to obtain a second estimated number of unique users (based on the assumption that each pair of dispenses that occurred within 10 seconds of one another were received by the same user). The first estimated number of unique users and the second estimated number of unique users may then be summed to obtain a first total estimated number of unique users.

A confidence factor may then be determined for the first total estimated number of unique users. Using the confidence factor, a first statistical number of unique users, each of whom is statistically assumed to have received two dispenses within 10 seconds of each other, may be determined. The first statistical number of unique users may be determined by multiplying the second number of dispenses by the confidence factor and dividing the result by two. A second statistical number of unique users, each of whom is statistically determined to have received a dispense more than 10 seconds apart from any other dispense, may then be determined. The second statistical number of unique users may be determined by subtracting the first statistical number of unique users from the second estimated number of unique users. The first estimated number of unique users, the first statistical number of unique users, and the second statistical number of unique users may then be summed to obtain a second total estimated number of unique users.

The second total estimated number of unique users may then be compared to the first total estimated number of unique users. If the difference between the first total and the second total is non-zero, the process described above may be repeated. More specifically, a new confidence factor may be determined based on the second total estimated number of unique users, and the process described above may be repeated using the second confidence factor to obtain a third total estimated number of unique users. The process may be iteratively performed to refine the estimate of the number of actual unique users until the statistical estimate is unchanged from one iteration to the next or within some threshold difference. In general, the lower the amount of user traffic (e.g., number of users per hour), the fewer number of iterations that may be required to obtain a statistically improved estimate of the number of unique users. A more accurate estimate of the number of unique users may, in turn, improve the accuracy of the aggregate usage per user calculations for dispensing periods, and thus, the accuracy of the optimized dispensing parameter value or the optimized range of dispensing parameter values.

In some embodiments, the determination of the estimated number of users for a dispensing period can be accomplished using other methods. Likewise, the following additional methods can be used to refine the above noted determination methods. In some example embodiments, multiple product dispensers (or other dispensers/sensors) can be used to determine the number of users during a dispensing period. In this regard, usage data from a nearby product dispenser can be utilized to determine whether dispenses on a first product dispenser were the result of one or more users.

In one example, when two product dispensers of the same type (e.g., paper towel dispensers) are next to or near each other, a user may receive a dispense from each product dispenser consecutively. In such a situation, a user may not be satisfied with the dispense from the first product dispenser and, thus, decide to receive a dispense from the second product dispenser additionally. Example embodiments of the present invention contemplate using that usage information to help determine if the same user caused both dispenses—thereby counting only as one user during the dispensing period for both product dispensers. An example embodiment of this concept follows.

In the example embodiment, Dispenser A and Dispenser B are near enough to each other in the washroom that a single user might use each of them once within 10 seconds. In such an embodiment, a controller may be configured to obtain usage data from both product dispensers, evaluate the usage data, identify that 2 dispense events (1 event per dispenser) should be accounted as a single user, and account for the single user in determining usage rates. For example as shown in Table 2 below, Dispenser A dispensed at 1:00:00 and Dispenser B dispensed 3 seconds later, so the controller determines that a single user took both towels. However, when Dispenser A dispensed at 2:00:00 and Dispenser B dispensed 13 seconds later, the controller determined that 2 users took the towels because the interval was greater than 10 seconds. Though this example embodiment utilizes time between dispenses to help distinguish users, other methods of distinguishing users as described with respect to embodiments herein can be utilized.

TABLE 2

|  | Dispenser A | Dispenser B | # users |
|---|---|---|---|
| First dispense events | 1:00:00 | 1:00:03 | 1 |
| Second dispense events | 2:00:00 | 2:00:13 | 2 |

In another example, there may be two product dispensers of different types (e.g., a paper towel dispenser and a soap dispenser) that are nearby and/or located in the same bathroom or environment. A user may receive a dispense from the first type of product dispenser (e.g., the soap dispenser) and then shortly thereafter receive a dispense from the second type of product dispenser (e.g., paper towel dispenser). However, there may be consecutive dispenses from the second type of product dispenser (e.g., paper towel dispenser) that would be otherwise attributed to two different users. In such a case, example embodiments of the present invention contemplate using the usage information from the first type of product dispenser (e.g., soap dispenser) to help determine if a single user caused both dispenses from the second type of product dispenser (e.g., paper towel dispenser). Such embodiments also contemplate distinguishing whether a single user caused multiple dispensers over multiple product dispensers (e.g., two paper towel dispensers) using the usage information of one or more other type of product dispenser (e.g., the soap dispenser). An example embodiment of this concept follows with multiple scenarios for explanation.

In an example embodiment, the dispenser controller may determine a more accurate number of individual users and more accurate usage rates using data available from a dissimilar but related dispenser. For example, a controller for a paper towel dispenser might have access to data from a nearby soap dispenser that is dissimilar but is likely to be used in relation with the towel dispenser. Reference to Table 3 will be made in each of the following scenarios.

As shown in Scenario 1 of Table 3, the controller identifies that a soap dispenser dispensed at 12:00:00. The controller further identifies that the paper towel dispenser dispensed 20 seconds later, and again 11 seconds after that. Normally, the controller for the paper towel dispenser would assume two unique users (more than 10 seconds between towel dispenses). However, in an example embodiment, the controller identifies that the interval between towel dispenses is close to the 10 second threshold, and also identifies that the soap dispenser only dispensed to a single user. Therefore, the controller for the towel dispenser ascribes only 1 user in Scenario 1 in order to improve the accuracies of the number of individual users and of usage rates. Notice that if the interval between towel dispenses is large enough (for example 15 seconds in Scenario 1b), the controller might determine that the chances of the same unique user taking both towels is low (for example, lower than the chances of a second user washing hands without soap), and therefore the controller ascribes 2 unique users to the data in the same manner as if the soap dispenser data were unavailable and the towel dispenser controller used the 10-second interval to distinguish between unique users.

As shown in Scenario 2 of Table 3, the controller identifies that a soap dispenser dispensed at 12:00:00 and again 2 seconds later, which may be much more likely to occur for a single unique user than two unique users. The controller further identifies that the towel dispenser dispensed at 12:00:20, and again 11 seconds after that. Normally, the controller for the towel dispenser may assume two unique users (more than 10 seconds between towel dispenses). However, in an example embodiment, the controller identifies that the interval between towel dispenses is close to the 10 second threshold, and also identifies that the interval between soap dispenses is indicative of a single user, therefore the controller for the towel dispenser ascribes only 1 user in Scenario 2 in order to improve the accuracies of the number of individual users and of usage rates. Notice that if the interval between towel dispenses is large enough (for example 15 seconds in Scenario 2b), the controller might determine that the chances of the same unique user taking both towels is low, and therefore the controller ascribes 2 unique users to the data according to a general threshold that greater than 10 seconds differentiates users.

As shown in Scenario 3 of Table 3, the controller identifies that a soap dispenser dispensed at 12:00:00 and again 15 seconds later, which may be much more likely to occur for two unique users than a single unique user. The controller further identifies that the towel dispenser dispensed at 12:00:20, and again 9 seconds after that. Normally, the controller for the towel dispenser would assume a single user (less than 10 seconds between towel dispenses). However, in an example embodiment, the controller identifies that the interval between towel dispenses is close to the 10 second threshold, and also identifies that the large interval between soap dispenses is indicative of two users, and may further identify that the interval between the last soap dispense and the first towel dispense is small and less likely to be from a single user. Therefore, the controller for the towel dispenser may ascribe 2 users in Scenario 2 in order to improve the accuracies of the number of individual users and of usage rates. Though these example embodiments utilize time between dispenses to help distinguish users, other methods of distinguishing users as described with respect to embodiments herein can be utilized.

TABLE 3

|  | Scenario 1 | Scenario 1b | Scenario 2 | Scenario 2b | Scenario 3 |
|---|---|---|---|---|---|
| Soap dispense 1 | 12:00:00 | 12:00:00 | 12:00:00 | 12:00:00 | 12:00:00 |
| Soap dispense 2 | none | none | 12:00:02 | 12:00:02 | 12:00:15 |
| Towel dispense 1 | 12:00:20 | 12:00:20 | 12:00:20 | 12:00:20 | 12:00:20 |
| Towel dispense 2 | 12:00:31 | 12:00:35 | 12:00:31 | 12:00:35 | 12:00:29 |
| # users | 1 | 2 | 1 | 2 | 2 |

In some embodiments, skewed data can be determined and removed from the usage data in order to cause more accurate determination of an optimized dispensing parameter value and/or number of users. In such embodiments, dispenses that correspond to abnormal uses of the product dispenser (e.g., letting the product dispense continuously, the occurrence of a jamming scenario, etc.) can be sensed and then filtered from the usage data accordingly. As such, in example embodiments, the controller selectively chooses which data to use for optimizing a dispensing parameter. The following provides example embodiments in accordance with this concept.

In an example embodiment, the product dispenser includes a means to determine when the user has retrieved towel. One such means is a tear bar that pivots and signals the controller when a user tears and retrieves towel. In such an embodiment, the controller may be configured to monitor the tear bar to determine when a user retrieves a towel, and how much towel the user actually retrieved (which may be different than the value of the dispensing parameter). In that case, the controller determines usage rates based upon the amount of towel that was dispensed before the tear bar activates.

It is possible that the tear bar may be pivoted for spurious reasons that do not accurately reflect usage. For example, if a janitor cleans the paper chute during maintenance, the janitor may inadvertently command a dispense and activate the tear bar in quick succession, dispensing only an inch or two of towel. In another example, excess paper may be stuck in the chute and a user might pull the paper out and actuate the tear bar immediately after commanding a dispense event. In a further example, a user may pull several inches of excess towel out of a dispenser after the dispense event has stopped. Situations such as these do not accurately depict usage rates yet mathematically skew the optimization of dispensing parameter. Thus, in an example embodiment, the controller does not take this data into account.

In an example embodiment, the controller may only include dispense data into determination of usage data and dispensing parameters for those dispense events in which the towel dispensed was a minimum length, such as 4".

In another example embodiment, the controller may only record a maximum sheet length (for example, 24") for determining usage data and dispensing parameters, even if a user pulled significant excess.

In a further example embodiment, the controller may identify other patterns that are not indicative of the behavior that the controller is attempting to optimize, such as tampering, obvious waste, etc., and exclude that data from optimization calculations.

In one or more other example embodiments of the disclosure, a capability of a user sensor to distinguish between genuine and false triggering events may be optimized. A user sensor may detect a triggering event and generate a dispense signal. In response to receipt of the dispense signal, a controller may determine one or more characteristics of the dispense signal. A characteristic of a dispense signal may include, without limitation, an amplitude of the dispense signal, a frequency of the dispense signal, a waveform of the dispense signal, or the like. The controller may then access a sensor profile associated with the user sensor to determine, based at least in part on the sensor profile, whether the characteristic(s) of the dispense signal are within a specified tolerance of signal characteristic(s) identified in the sensor profile. In certain example embodiments, this may include determining that the sensor profile includes or is otherwise associated with a second signal characteristic that matches a first signal characteristic of the dispense signal within a specified tolerance, determining a probability that the second signal characteristic is indicative of a genuine user-initiated triggering event, and further determining that the probability meets or exceeds a threshold probability value. For example, if the first signal characteristic of the dispense signal is an amplitude of the dispense signal, the second signal characteristic may be an amplitude of a previously received dispense signal. If the two amplitudes are within a threshold value of one another, and if a probability that the amplitude of the previously received dispense signal is indicative of a genuine user-initiated triggering event meets or exceeds a threshold probability value (e.g., greater than or equal to 75%), it may be determined that a dispensing cycle should be initiated in response to the current dispense signal. On the other hand, if the first signal characteristic of the current dispense signal matches a second signal characteristic associated with the sensor profile within a specified tolerance, and if a probability that the second signal characteristic is indicative of genuine user-initiated triggering event is below the specified threshold probability value, that dispensing cycle may not be initiated in response to the current dispense signal because it may be determined that the current dispense signal is unlikely to be indicative of a genuine user-initiated triggering event, and a dispensing cycle may not be initiated. It should be appreciated that a probability that a dispense signal is indicative of a false trigger may be evaluated with respect to a corresponding threshold probability value in addition to or in lieu of a probability that the dispense signal is indicative of a genuine user trigger.

If, based on an evaluation of the current dispense signal with respect to the sensor profile, it is determined that the probability that the current dispense signal is indicative of a genuine user-triggering event meets or exceeds a specified threshold probability value, the controller may generate an actuation signal to cause a dispensing mechanism of the product dispenser to dispense an amount of product. A time that elapses between receipt of the dispense signal (or generation of the actuation signal or completion of the dispensing cycle) and receipt of an indication that the product has been used or retrieved may then be determined. For example, if the product dispenser dispenses towel, retrieval of the dispensed product may be determined based on activation of a tear sensor. As another example, if the product dispenser dispenses solids, liquids, gases, or a mixed-phase product such as an aerosol, foam, gel, or the like, for example a soap product, use/retrieval of the dispensed product may be determined based upon deactivation of a sensor, such as a user request sensor, that detects a user's hand that would receive soap in a particular location relative to the dispenser.

If the elapsed time is within a predetermined threshold range of time, the controller may determine that the dispense signal was indicative of a genuine user-initiated triggering event, in which case, the sensor profile may be modified to indicate an increased likelihood (e.g., an increased probability) that characteristic(s) of the dispense signal are indicative of a genuine trigger. If, on the other hand, the elapsed time is not within the predetermined threshold range of time, that is, that an indication of use/retrieval of the dispensed product was not received within the threshold range of time from a time corresponding to receipt of the dispense signal, generation of the actuation signal, initiation of the dispensing cycle, or completion of the dispensing cycle, then the sensor profile may be modified to indicate a decreased likelihood (e.g., a decreased probability) that the characteristic(s) of the dispense signal are indicative of a genuine user trigger, and therefore, an increased likelihood (e.g., an increased probability) that the characteristics(s) of the dispense signal are indicative of a false trigger. In an example embodiment involving a towel dispenser, if an elapsed time between receipt of the dispense signal and receipt of a tear sensor activation signal is within a predetermined threshold range of time (e.g., 0 to 4 seconds), this may constitute evidence of typical user behavior and may indicate that the dispense signal was characteristic of a genuine user request for product. As such, the sensor profile may be modified to indicate an increased likelihood that characteristic(s) of the dispense signal are indicative of a genuine trigger. If, on the other hand, an elapsed time between receipt of the dispense signal and receipt of a tear sensor activation signal is not within a predetermined threshold range of time (e.g., 0 to 4 seconds), this may constitute evidence contrary to genuine user behavior and may indicate that the dispense signal was not characteristic of a genuine user request for product. As such, the sensor profile may be modified to indicate a decreased likelihood that characteristic(s) of the dispense signal are indicative of a genuine trigger.

Along similar lines, in an example embodiment involving a soap dispenser, if an elapsed time of continuous receipt of the dispense signal, which may constitute evidence of the presence of a user's hand, is within a predetermined threshold range of time (e.g., 1 to 2 seconds), this may constitute evidence of typical user behavior and may indicate that the dispense signal was characteristic of a genuine user request for product. As such, the sensor profile may be modified to indicate an increased likelihood that characteristic(s) of the dispense signal are indicative of a genuine trigger. If, on the other hand, an elapsed time of continuous receipt of the dispense signal is not within a predetermined threshold range of time (e.g., 1 to 2 seconds), this may constitute evidence that the dispense signal was not characteristic of a genuine user request for product. As such, the sensor profile may be modified to indicate a decreased likelihood that characteristic(s) of the dispense signal are indicative of a genuine trigger. The above process may continue iteratively such that the sensor profile is refined over time to more accurately distinguish dispense signals indicative of genuine user triggers from dispense signals indicative of false triggers.

Example embodiments of the disclosure provide a number of technical features or technical effects. For example, in accordance with example embodiments of the disclosure, a dispensing parameter value may be optimized to achieve a desired performance outcome (e.g., minimized product usage, maximized user sensor reliability, etc.) in an automated fashion that accounts for fluctuations in user traffic, user behavior, or the like and that does not require manual user adjustment of the dispensing parameter. It should be appreciated that the above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings.

Illustrative Device Architecture

FIG. 1 is a diagram depicting a schematic representation of an illustrative product dispenser 102 and an illustrative networked architecture 100 that includes the product dispenser 102 in accordance with one or more example embodiments of the disclosure. The product dispenser 102 may be any suitable product dispenser including, but not limited to, automated product dispensers that dispense product in response to activation of a user sensor, tear sensor, or the like. While example embodiments may be described in connection with automated product dispensers, it should be appreciated that such example embodiments may be applicable to mechanically/manually operated product dispensers, air blowers, or the like.

In an illustrative configuration, the product dispenser 102 may include one or more controllers 112, one or more memory devices 114 (generically referred to herein as memory 114), one or more input/output ("I/O") interface(s) 116, one or more network interfaces 118, one or more sensors or sensor interfaces 120, one or more transceivers 122, and data storage 126. The product dispenser 102 may further include one or more buses 124 that functionally couple various components of the product dispenser 102. The product dispenser 102 may further include one or more antennas 140 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 124 may include at least one of a system bus, a memory bus, an address bus, or a message bus, and may permit exchange of information (e.g., data (including computer-executable code), signaling, etc.) between various components of the product dispenser 102. The bus(es) 124 may include, without limitation, a memory bus or a memory controller, a peripheral bus, an accelerated graphics port, and so forth. The bus(es) 124 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 114 of the product dispenser 102 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 114 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 114 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 126 may include removable storage and/or non-removable storage including, but not limited to, magnetic storage, optical disk storage, and/or tape storage. The data storage 126 may provide non-volatile storage of computer-executable instructions and other data. The memory 114 and the data storage 126, removable and/or non-removable, are examples of computer-readable storage media (CRSM) as that term is used herein.

The data storage 126 may store computer-executable code, instructions, or the like that may be loadable into the memory 114 and executable by the controller(s) 112 to cause the controller(s) 112 to perform or initiate various operations. The data storage 126 may additionally store data that may be copied to memory 114 for use by the controller(s) 112 during the execution of the computer-executable instructions. Moreover, output data generated as a result of execution of the computer-executable instructions by the controller(s) 112 may be stored initially in memory 114, and may ultimately be copied to data storage 126 for non-volatile storage.

More specifically, the data storage 126 may store one or more program modules, applications, or the like such as, for example, one or more dispensing parameter optimization modules 128 which, in turn, may include one or more sub-modules such as, for example, one or more dispensing parameter value adjustment modules 130 and one or more unique user determination modules 132. The data storage 126 may further store one or more dispensing control modules 134. The data storage 126 may additionally store any of a variety of other types of modules such as, for example, one or more application modules associated with one or more applications executable on the product dispenser 102. It should be appreciated that, in various example embodiments, the data storage 126 may not be provided, and any program modules or other data depicted or described as being potentially stored in the data storage 126 may be stored in the memory 114 (e.g., non-volatile memory) instead.

Referring now to functionality supported by the various program modules depicted in FIG. 1, the dispensing control module(s) 134 may include computer-executable instructions, code, or the like that responsive to execution by one or more of the controller(s) 112 may cause an actuation signal to be generated in response to a dispense signal received from a user sensor 120, a tear sensor 120, or the like. The actuation signal may cause a dispensing mechanism 136 of the product dispenser 102 to dispense a predetermined amount of product as part of a dispensing cycle during a dispensing period. A dispensing period may include any number of dispensing cycles during which predetermined amounts of products are dispensed to users 104.

More specifically, in certain example embodiments, the actuation signal may cause a voltage to be supplied from a power source (e.g., a battery) (not shown) to actuate a motor of the dispensing mechanism 136 to cause a predetermined amount of product from a product supply 138 to be dispensed. The actuation signal may cause a voltage to be supplied to the motor of the dispensing mechanism 136 for a sufficient duration to cause the motor to actuate one or more other components of the dispensing mechanism 136 (e.g., one or more rollers, a pump, a fan, etc.) to dispense a predetermined amount of product in accordance with a current value of a dispensing parameter. As previously noted, the dispensing parameter may include any suitable parameter including, but not limited to, a dispense duration, a sheet length, a volume of product, or the like.

The dispensing parameter optimization module(s) 128 may include computer-executable instructions, code, or the like that responsive to execution by one or more of the controller(s) 112 may cause one or more iterations of a dispensing parameter value optimization process to be performed in accordance with example embodiments of the disclosure. As previously described and as will be described in more detail later in this disclosure, the dispensing parameter value optimization process may include maintaining, for any two dispensing periods, respective first counters representing an aggregate amount of product dispensed for each dispensing period and respective second counters representing a number of unique users that received dispenses for each dispensing period, and determining a relationship between the respective first counters and a relationship between the respective second counters in order to determine, in accordance with algorithmic logic, whether a current (or some previous) dispensing parameter value should be increased, decreased, or remain unchanged to obtain a dispensing parameter value for a subsequent dispensing period.

The dispensing parameter value adjustment module(s) 130 may include computer-executable instructions, code, or the like that responsive to execution by one or more of the controller(s) 112 may cause a current value (or some previous value) of a dispensing parameter for a current (or previous) dispensing period to be increased, decreased, or remain unmodified based on the results of a current iteration of the dispensing parameter value optimization process in order to obtain a subsequent dispensing parameter value for a subsequent dispensing period. The dispensing parameter optimization module(s) 128 may further include computer-executable instructions, code, or the like that responsive to execution by one or more of the controller(s) 112 may cause processing to be performed to optimize a capability of a user sensor 120 of the product dispenser 102 to distinguish between genuine and false triggers.

The unique user determination module(s) 132 may include computer-executable instructions, code, or the like that responsive to execution by one or more of the controller(s) 112 may cause processing to be performed to determine a number of unique users during a dispensing period using, for example, a threshold period of time between dispensing cycles to determine whether any two given dispenses are attributable to the same user or different users. The unique user determination module(s) 132 may further include computer-executable instructions, code, or the like that responsive to execution by one or more of the controller(s) 112 may cause processing to be performed to refine an estimate of the number of unique users for a dispensing period using a statistical process that employs a statistically determined confidence factor.

Referring now to other illustrative components of the product dispenser 102, the controller(s) 112 may be configured to access the memory 114 and execute computer-executable instructions loaded therein. For example, the controller(s) 112 may be configured to execute computer-executable instructions of the various program modules of the product dispenser 102 to cause or facilitate various operations to be performed in accordance with one or more embodiments of the disclosure. The controller(s) 112 may include any suitable processing unit capable of accepting data as input, processing the input data in accordance with stored computer-executable instructions, and generating output data. The controller(s) 112 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the controller(s) 112 may have any suitable microarchitecture design that includes any number of constituent components such as, for example, registers, multiplexers, arithmetic logic units, cache controllers for controlling read/write operations to cache memory, branch predictors, or the like. The microarchitecture design of the controller(s) 112 may be capable of supporting any of a variety of instruction sets.

In addition, the product dispenser 102 may include one or more input/output (I/O) interfaces 116 that may facilitate the receipt of input information by the product dispenser 102 from one or more I/O devices as well as the output of information from the product dispenser 102 to the one or more I/O devices. The I/O devices may include, for example, one or more user interface devices that facilitate interaction between a user and the product dispenser 102 including, but not limited to, a display, a keypad, a pointing device, a control panel, a touch screen display, a stylus, a remote control device, a microphone, a speaker, and so forth. The I/O devices may further include, for example, any number of peripheral devices such as data storage devices, printing devices, and so forth.

The product dispenser 102 may further include one or more network interfaces 118 via which the product dispenser 102 may communicate with any of a variety of other systems, platforms, networks, devices, and so forth. Such communication may occur via any of the types of networks previously described. The product dispenser 102 may be configured to communicate via one or more networks 110 with, for example, one or more back-end servers 106. The network(s) 110 may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, the network(s) 110 may have any suitable communication range associated therewith and may include, for example, global networks (e.g., the Internet), metropolitan area networks (MANs), wide area networks (WANs), local area networks (LANs), or personal area networks (PANs). In addition, the network(s) 110 may include communication links and associated networking devices (e g, link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In addition, the product dispenser 102 may include one or more antenna(s) 140 that may include any suitable type of antenna depending, for example, on the communications protocols used to transmit or receive signals via the antenna(s) 140. Non-limiting examples of suitable antennas may include directional antennas, non-directional antennas, dipole antennas, folded dipole antennas, patch antennas, multiple-input multiple-output (MIMO) antennas, or the like. The antenna(s) 140 may be communicatively coupled to one or more transceivers 122 or radio components to which or from which signals may be transmitted or received.

As previously described, the antenna(s) 140 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (WCDMA), CDMA2000, etc.), 4G standards (e.g., Long-Term Evolution (LTE), WiMax, etc.), direct satellite communications, or the like.

The antenna(s) 140 may additionally, or alternatively, include a Wi-Fi antenna configured to transmit or receive signals in accordance with established standards and protocols, such as the IEEE 802.11 family of standards, including via 2.4 GHz channels (e.g. 802.11b, 802.11g, 802.11n), 5 GHz channels (e.g. 802.11n, 802.11ac), or 60 GHZ channels (e.g. 802.11ad). In alternative example embodiments, the antenna(s) 232 may be configured to transmit or receive radio frequency signals within any suitable frequency range forming part of the unlicensed portion of the radio spectrum.

The antenna(s) 140 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 122 may include any suitable radio component(s) for—in cooperation with the antenna(s) 140—transmitting or receiving radio frequency (RF) signals in the bandwidth and/or channels corresponding to the communications protocols utilized by the product dispenser 102 to communicate with other devices. The transceiver(s) 122 may include hardware, software, and/or firmware for modulating, transmitting, or receiving—potentially in cooperation with any of antenna(s) 140—communications signals according to any of the communications protocols discussed above including, but not limited to, one or more Wi-Fi and/or Wi-Fi direct protocols, as standardized by the IEEE 802.11 standards, one or more non Wi-Fi protocols, or one or more cellular communications protocols or standards. The transceiver(s) 122 may further include hardware, firmware, or software for receiving GNSS signals. The transceiver(s) 122 may include any known receiver and baseband suitable for communicating via the communications protocols utilized by the product dispenser 102. The transceiver(s) 122 may further include a low noise amplifier (LNA), additional signal amplifiers, an analog-to-digital (A/D) converter, one or more buffers, a digital baseband, or the like.

The sensor(s)/sensor interface(s) 120 may include or may be capable of interfacing with any suitable type of sensing device such as, for example, a sheet length sensor, a tear sensor, a photo sensor, a radar-based sensor, a passive infrared sensor, an active infrared sensor, a capacitive sensor, or any other suitable type of sensor capable of being triggered, for example, by the presence, motion, or quantity of an object.

Further, although not depicted in FIG. 1, the product dispenser 102 may further include an operating system (0/S) that may be loaded from the data storage 126 into the memory 114 and that may provide an interface between other software modules executing on the product dispenser 102 and hardware resources of the product dispenser 102. More specifically, the O/S may include a set of computer-executable instructions for managing hardware resources of the product dispenser 102 and for providing common services to other program modules (e.g., managing memory allocation among various program modules).

In addition, the product dispenser 102 may include a database management system (DBMS) that may be loaded into the memory 114 from the data storage 126 and that may support functionality for accessing, retrieving, storing, and/or manipulating data stored in the memory 114 and/or data stored in the data storage 126. The DBMS may be, for example, a light-weight DBMS optimized for performance on the product dispenser 102. The DBMS may use any of a variety of database models (e.g., relational model, object model, etc.) and may support any of a variety of query languages. The DBMS may access data represented in one or more data schemas and stored in any suitable data repository including, but not limited to, one or more of the datastore(s) 108, which may include databases (e.g., relational, object-oriented, etc.), file systems, flat files, distributed datastores in which data is stored on more than one node of a computer network, peer-to-peer network datastores, or the like.

The back-end server(s) 106 may include any suitable computing device and may include any of the illustrative types of hardware, firmware, and/or software components described in relation to the product dispenser 102. The back-end server(s) 106 may be configured to receive usage data for the dispenser 102 (and any number of additional dispensers), analyze the usage data, and generate performance data indicative of performance metrics associated with operation of the dispenser 102. For example, the back-end server(s) 106 may generate performance data that indicates changes in the aggregate usage per user for the product dispenser 102 over some period of time. The performance data may be used to evaluate the optimization process and to determine whether one or more modifications to the process (e.g., modifying an incremental amount by which a dispensing parameter value is incremented or decremented from one dispensing period to the next) may be needed based on user behavior trends identified from the performance data. For example, if the usage data indicates increased user traffic for one or more dispensing periods, the duration of a dispensing period may be shortened. As another example, if the usage data indicates increased user traffic, the predetermined threshold time period used to distinguish dispenses occurring to a same user or to different users may be decreased in order to maintain a desired confidence factor. It should be appreciated that the above examples are merely illustrative and not exhaustive. It should further be appreciated that any of the processing that may be performed responsive to execution of any of the program modules of the product dispenser 102 may be performed, at least in part, by the back-end server(s) 106. For example, the back-end server(s) 106 and the product dispenser 102 may execute the dispensing parameter value optimization process in a distributed fashion. Further, the analysis and generation of performance data may be performed, at least in part, by executable logic stored on the product dispenser 102. Likewise, in some embodiments, the server(s) 106 may perform any functionality described herein to determine the optimized dispensing parameter value and may instruct the one or more product dispensers to adjust their dispensing parameter values accordingly.

Various data that may be utilized or generated by the product dispenser 102 and/or the back-end server(s) 106 may be stored in the datastore(s) 108. The data may include, for example, counter values 142, dispensing parameter values 144, confidence factors 146, and any other suitable types of data 148. The counter values may include respective first counter values representing aggregate usage for each of any number of dispensing periods and/or respective second counter values representing an estimated number of unique users for each of any number of dispensing periods. The dispensing parameter values 144 may include a pre-programmed or manually set initial dispensing parameter value, respective calculated values for each of any number of dispensing periods, measured dispensing parameter values, and so forth. The confidence factors 146 may include different confidence factors calculated for different estimated numbers of unique users for any number of dispensing periods. The other data 148 may include any other suitable data such as dispense signal characteristics, a sensor profile of the product dispenser 102, and so forth. Any of the data depicted as being stored in the datastore(s) 108 may be generated by the product dispenser 102 and/or the back-end server(s) 106 and may be additionally, or alternatively, stored in the data storage 126 and/or the memory 114 of the product dispenser 102 and/or in suitable storage media of the back-end server(s) 106.

It should be appreciated that the back-end server(s) 106, the datastore(s) 108, and the network(s) 110 may be optional in certain example embodiments of the disclosure. In addition, in certain example embodiments, all of the algorithmic logic for performing optimization processes as described herein may reside locally on the product dispenser 102, thereby obviating the need for the product dispenser 102 to communicate over a network. Thus, in certain example embodiments, the network interface(s) 118, transceiver(s) 122, and antenna(s) 140 may not be present.

Figure 1A:
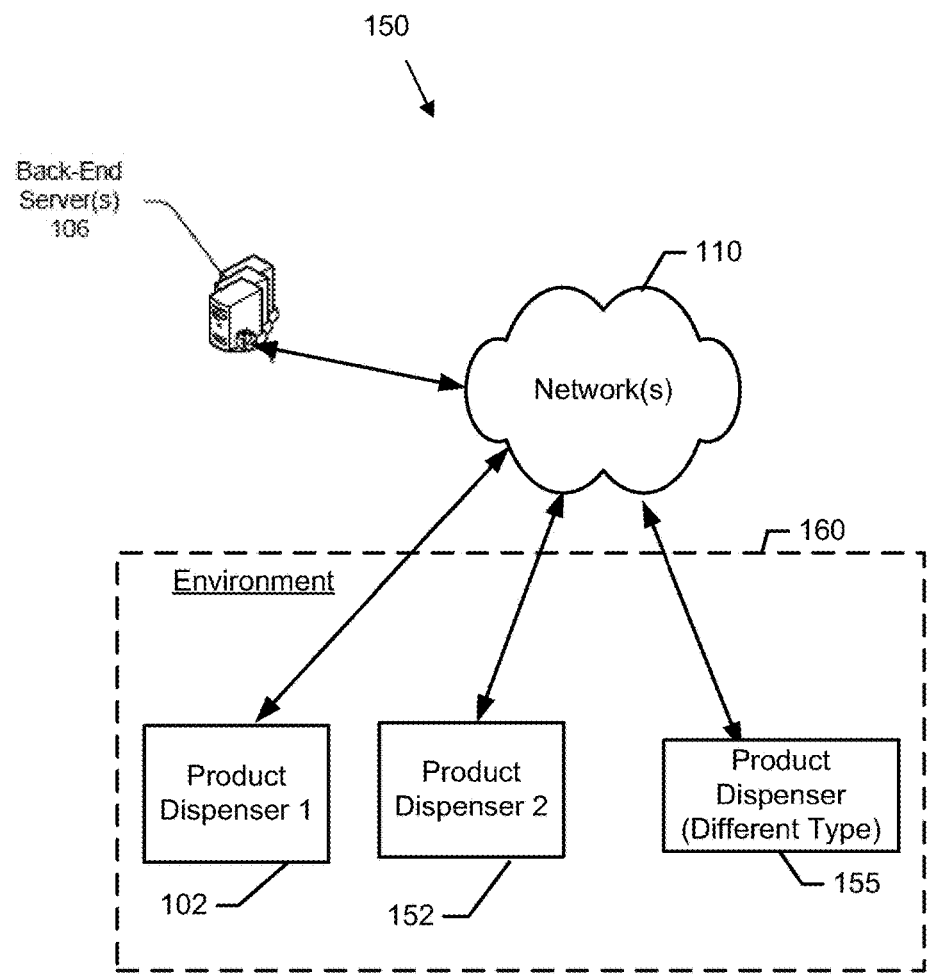
FIG. 1A is a diagram depicting another schematic representation of an illustrative networked architecture that includes the product dispenser in accordance with one or more example embodiments of the disclosure.

FIG. 1A is a diagram depicting a schematic representation of another illustrative networked architecture 150 that includes the product dispenser 102 and server(s) 106 in accordance with one or more example embodiments of the disclosure. Additionally, the depicted networked architecture 150 includes a second product dispenser 152 of the same type of product as product dispenser 102 (e.g., product dispenser 102 and product dispenser 152 both dispense paper towel) and a third product dispenser 155 of a different type of product as product dispenser 102 (e.g., product dispenser 102 dispenses paper towel and product dispenser 155 dispenses soap). Each product dispenser (e.g., product dispenser 152 and 155) may include any hardware and/or software described herein and be operated in accordance with any example embodiments described herein (such as described with respect to product dispenser 102). Likewise, while two additional product dispensers are shown, more or less product dispensers are contemplated.

As will be described in greater detail herein, networked architecture 150 may be utilized with respect to embodiments of the present invention that contemplate using more than one product dispenser that are within a common or similar environment 160 (e.g., the product dispensers are in school house bathrooms, the product dispensers are in the same bathroom, etc.).

As detailed above with respect to networked architecture 100, the server(s) 106, each individual product dispenser 102, 152, 155, or combinations thereof may be utilized to perform any of the functionality described herein. For example, the server(s) 106 may perform part of the functionality while one or more product dispensers perform other parts of the functionality. Likewise, one product dispenser (e.g., product dispenser 102) may perform functionality that includes receiving dispensing data from another product dispenser (e.g., product dispenser 152), determining an optimized dispensing parameter value, and instructing the other product dispenser to adjust the dispensing parameter value accordingly.

It should be appreciated that the program modules, applications, computer-executable instructions, code, data, or the like depicted in FIGS. 1 and 1A as being stored in the data storage 126 and the datastore(s) 108 are merely illustrative and not exhaustive and that processing described as being supported by any particular module may alternatively be distributed across multiple modules or performed by a different module. In addition, various program module(s), script(s), plug-in(s), Application Programming Interface(s) (API(s)), or any other suitable computer-executable code hosted locally on the product dispenser 102, on the back-end server(s) 106, and/or hosted on other computing device(s) accessible via one or more of the network(s) 110, may be provided to support functionality provided by the program modules, applications, or computer-executable code depicted in FIGS. 1 and 1A and/or additional or alternate functionality. Further, functionality may be modularized differently such that processing described as being supported collectively by the collection of program modules depicted in FIGS. 1 and 1A may be performed by a fewer or greater number of modules, or functionality described as being supported by any particular module may be supported, at least in part, by another module. In addition, program modules that support the functionality described herein may form part of one or more applications executable across any number of systems or devices in accordance with any suitable computing model such as, for example, a client-server model, a peer-to-peer model, and so forth. In addition, any of the functionality described as being supported by any of the program modules depicted in FIG. 1 may be implemented, at least partially, in hardware and/or firmware across any number of devices.

It should further be appreciated that any of the components of the networked architecture 100 (in FIG. 1) or 150 (in FIG. 1A) may include alternate and/or additional hardware, software, or firmware components beyond those described or depicted without departing from the scope of the disclosure. More particularly, it should be appreciated that software, firmware, or hardware components depicted as forming part of the product dispenser 102 are merely illustrative and that some components may not be present or additional components may be provided in various embodiments. While various illustrative program modules have been depicted and described as software modules stored in data storage 126, it should be appreciated that functionality described as being supported by the program modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Moreover, while certain modules may be depicted and described as sub-modules of another module, in certain embodiments, such modules may be provided as independent modules or as sub-modules of other modules.

Illustrative Processes

Figure 2:
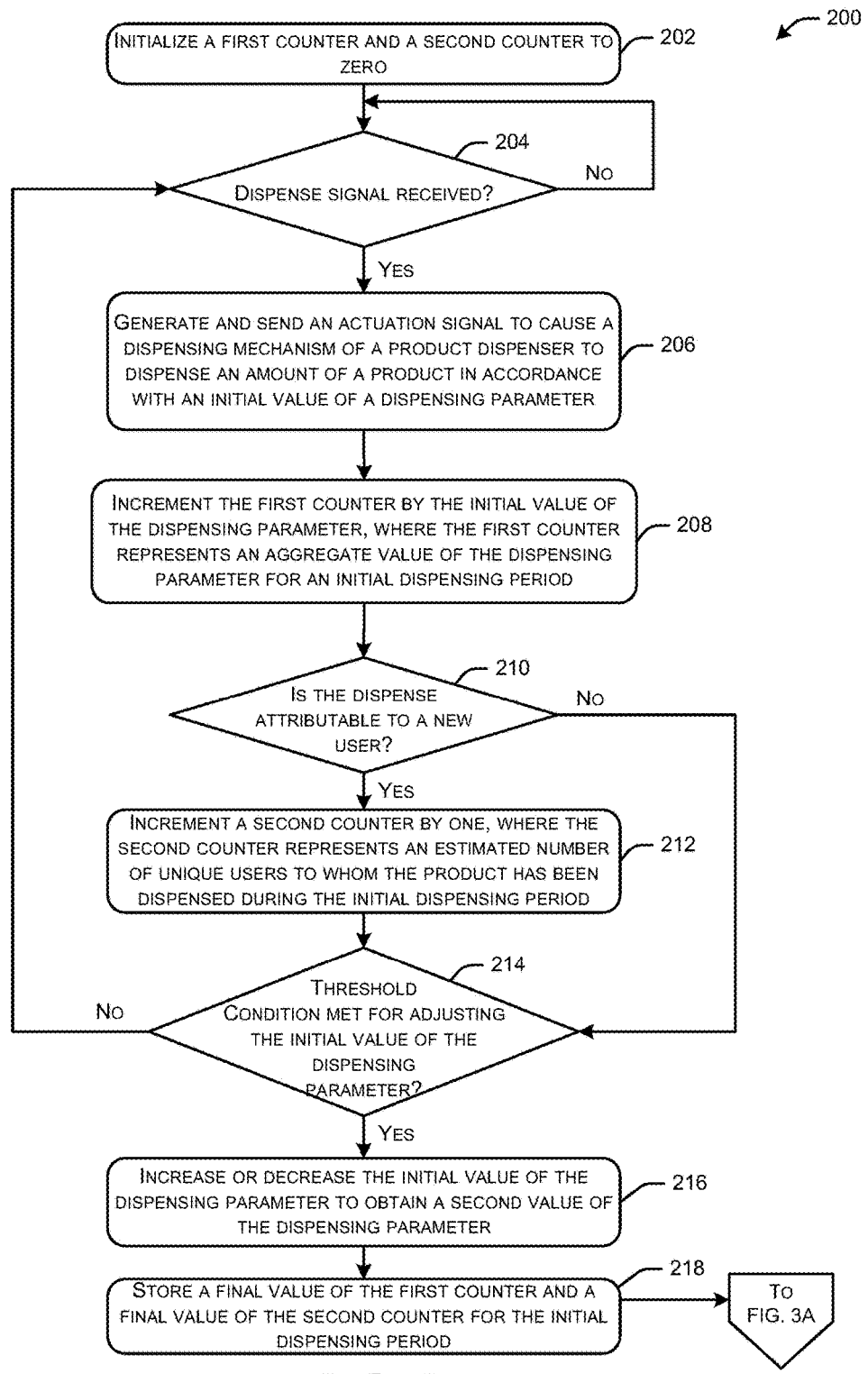
FIG. 2 is a process flow diagram of an illustrative method for maintaining a first counter representing an aggregate amount of product dispensed in accordance with an initial value of a dispensing parameter during an initial dispensing period and a second counter representing a number of unique users that received dispenses from the product dispenser during the initial dispensing period, determining that a threshold condition is met for adjusting the initial value of the dispensing parameter, and adjusting the initial value to obtain a second value of the dispensing parameter for a second dispensing period that follows the initial dispensing period in accordance with one or more example embodiments of the disclosure.

FIG. 2 is a process flow diagram of an illustrative method 200 for maintaining a first counter representing an aggregate amount of product dispensed in accordance with an initial value of a dispensing parameter during an initial dispensing period and a second counter representing a number of unique users that received dispenses from the product dispenser during the initial dispensing period, determining that a threshold condition is met for adjusting the initial value of the dispensing parameter, and adjusting the initial value to obtain a second value of the dispensing parameter for a second dispensing period that follows the initial dispensing period in accordance with one or more example embodiments of the disclosure.

At block 202, computer-executable instructions of the dispensing parameter optimization module(s) 128 may be executed to initialize a first counter and a second counter to zero. In the context of method 200, the first counter may be used to maintain a running count of an accumulated/aggregate value of a dispensing parameter during an initial dispensing period. For example, the first counter may represent, at any given point during the initial dispensing period, an aggregate amount of sheet product that has dispensed during the initial dispensing period up until that point. As another example, the first counter may represent a running count of an aggregate dispense duration for dispenses that have occurred during the initial dispensing period.

At block 204, computer-executable instructions of the dispensing control module(s) 134 may be executed to determine whether a dispense signal has been generated by/received from a sensor 120 of the product dispenser 102. If no dispense signal is detected, the determination at block 204 may be performed iteratively until a dispense signal is detected. On the other hand, if a dispense signal is detected, the controller(s) 112 may execute computer-executable instructions of the dispensing control module(s) 134 at block 206 to generate an actuation signal and communicate the actuation signal to the dispensing mechanism 136 of the product dispenser 102 to cause the dispensing mechanism 136 to dispense an amount of a product from the product supply 138. The product may be dispensed in accordance with an initial value of the dispensing parameter for the initial dispensing period. As previously noted, the dispensing parameter may be a dispense duration, a sheet product length, a volume of product, or any other suitable dispensing parameter. In an example embodiment, the initial value of the dispensing parameter may be a pre-programmed value or a value that is manually set using a physical button or switch or via user interaction with a user interface (e.g., a touch screen interface) of the product dispenser 102.

At block 208, computer-executable instructions of the dispensing parameter optimization module(s) 128 may be executed to increment the first counter by the initial value of the dispensing parameter. In certain example embodiments, rather than incrementing the first counter by the initial pre-programmed or preset initial value, the first counter may be incremented by a measured value of the dispensing parameter if, for example, the measured value deviates from the initial value because a user prematurely halted the dispensing cycle.

At block 210, computer-executable instructions of the unique user determination module(s) 132 may be executed to determine whether the dispense is attributable to a new user or the same user. For example, the unique user determination module(s) 132 may determine that the dispense is attributable to a different user than a user with whom the preceding dispense is associated if a time associated with the dispensing cycle occurred more than a threshold period of time apart from a time associated with the preceding dispensing cycle. Conversely, the unique user determination module(s) 132 may determine that the dispense is attributable to the same user as the previous dispense if a time associated with the dispensing cycle occurred within the predetermined period of time of a time associated with the preceding dispensing cycle.

In response to an affirmative determination at block 210, computer-executable instructions of the unique user determination module(s) 132 may be executed at block 212 to increment the second counter by one. In the context of method 200, the second counter may maintain a running count of the number of unique users to whom product has been dispensed up until a given point during the initial dispensing period. The method 200 may then proceed to block 214. On the other hand, in response to a negative determination at block 210, the method 200 may proceed directly to block 214 without incrementing the second counter. As will be described in more detail later in reference to FIGS. 5A-5B, the estimate of the number of unique users that used the dispenser during a dispensing period may be refined through the use of a confidence factor in order to arrive at a more accurate estimate of the actual number of users.

At block 214, computer-executable instructions of the dispensing parameter optimization module(s) 128 may be executed to determine whether a threshold condition is met for adjusting the initial value of the dispensing parameter. In the context of method 200, the threshold condition may be a condition that signals the end of the initial dispensing period such as, for example, a threshold number of dispensing cycles being reached during the initial dispensing period, a threshold number of unique users to whom product has been dispensed during the initial dispensing period, a threshold period of time having elapsed during the initial dispensing period, and so forth.

In response to a negative determination at block 214, the method 200 may return to block 204 and may be performed iteratively for each subsequent dispense request. On the other hand, in response to an affirmative determination at block 214, computer-executable instructions of the dispensing parameter value adjustment module(s) 130 may be executed at block 216 to increase or decrease the initial dispensing parameter value to obtain a second value of the dispensing parameter for a second dispensing period that follows the initial dispensing period. In certain example embodiments, the initial value of the dispensing parameter may be decreased to obtain the second value of the dispensing parameter based on a default assumption that a reduction in the amount of product dispensed per dispensing cycle may result in a reduced overall usage per user for a dispensing period. For example, if an initial sheet length of 10 inches is dispensed for each dispensing cycle during the initial dispensing period, the sheet length may be reduced to 9 inches for the subsequent second dispensing period.

At block 218, computer-executable instructions of the dispensing parameter optimization module(s) 128 may be executed to store the final values of the first and second counters for the initial dispensing period. From block 218, the method 300 may be initiated in connection with a second dispensing period that follows the initial dispensing period. Alternatively, the method 300 may be initiated in connection with any given dispensing period corresponding to operation of a product dispenser.

FIGS. 3A-3D are process flow diagrams of an illustrative method 300 for optimizing a value of a dispensing parameter based on product usage data that includes maintaining a first counter representing an aggregate amount of product dispensed during a current dispensing period in accordance with a current value of a dispensing parameter and a second counter representing a number of unique users that received dispenses from the product dispenser during the current dispensing period and comparing the first counter and the second counter to corresponding stored counters associated with a previous dispensing period to determine whether and in what manner to adjust any previous value of the dispensing parameter to obtain an updated value of the dispensing parameter for any dispensing period subsequent to the current dispensing period in accordance with one or more example embodiments of the disclosure. It should be appreciated that the method 300 may be performed in connection with a second dispensing period that immediately follows the initial dispensing period referenced in FIG. 2 or may be performed in connection with a second dispensing period that may represent any dispensing period that follows any previous dispensing period.

At block 302, computer-executable instructions of the dispensing parameter optimization module(s) 128 may be executed to initialize a first counter and a second counter to zero. The operations at block 302 need not be performed if separate sets of first and second counters are maintained for each dispensing period. In the context of method 300, the first counter may be used to maintain a running count of an accumulated/aggregate value of a dispensing parameter during a current dispensing period.

At block 304, computer-executable instructions of the dispensing control module(s) 134 may be executed to determine whether a dispense signal has been generated by/received from a sensor 120 of the product dispenser 102. If no dispense signal is detected, the determination at block 304 may be performed iteratively until a dispense signal is detected. On the other hand, if a dispense signal is detected, the controller(s) 112 may execute computer-executable instructions of the dispensing control module(s) 134 at block 306 to generate an actuation signal and communicate the actuation signal to the dispensing mechanism 136 of the product dispenser 102 to cause the dispensing mechanism 136 to dispense an amount of a product from the product supply 138. The product may be dispensed in accordance with a current value of the dispensing parameter for the current dispensing period. If the current dispensing period is a second dispensing period that immediately follows the initial dispensing period, the current value of the dispensing parameter may be the value generated at block 216 of method 200. If, on the other hand, the current dispensing period is a second dispensing period that follows a first dispensing period other than the initial dispensing period, the current value of the dispensing parameter for the second dispensing period may have been determined in accordance with the optimization process of method 300, as described in more detail below.

At block 308, computer-executable instructions of the dispensing parameter optimization module(s) 128 may be executed to increment the first counter by the current value of the dispensing parameter. The value of a dispensing parameter that is used to increment the first counter at block 308 may be a value determined based on a default setting (as may be the case where the immediately preceding dispensing period was the initial dispensing period), a value calculated in accordance with an optimization process disclosed herein, or a directly measured value. The value may be a measured value if, for example, the measured value deviates from the initial value because a user prematurely halted the dispensing cycle.

At block 310, computer-executable instructions of the unique user determination module(s) 132 may be executed to determine whether the dispense is attributable to a new user or the same user. In response to an affirmative determination at block 310, computer-executable instructions of the unique user determination module(s) 132 may be executed at block 312 to increment the second counter by one. In the context of method 300, the second counter may maintain a running count of the number of unique users to whom product has been dispensed up until a given point during the current dispensing period. The method 300 may then proceed to block 314. On the other hand, in response to a negative determination at block 310, the method 300 may proceed directly to block 314 without incrementing the second counter.

At block 314, computer-executable instructions of the dispensing parameter optimization module(s) 128 may be executed to determine whether a threshold condition is met for adjusting the current value of the dispensing parameter. In the context of method 300, the threshold condition may be a condition that signals the end of the current dispensing period such as, for example, a threshold number of dispensing cycles being reached during the current dispensing period, a threshold number of unique users to whom product has been dispensed during the current dispensing period, a threshold period of time having elapsed during the current dispensing period, and so forth.

In response to a negative determination at block 314, the method 300 may return to block 304 and may be performed iteratively for each subsequent dispense request. On the other hand, in response to an affirmative determination at block 314, computer-executable instructions of the dispensing parameter value adjustment module(s) 130 may be executed to perform various comparisons including a comparison between the current value of dispensing parameter and a previous value of the dispensing parameter for a previous dispensing period and a comparison of a ratio of the current value of the first counter to the current value of the second counter for the current dispensing period and a ratio of a previous value of the first counter to a previous value of the second counter for that previous dispensing period. The operations of blocks 316-324 may represent the algorithmic logic embodied in Table 1 provided above.

Figure 3A:
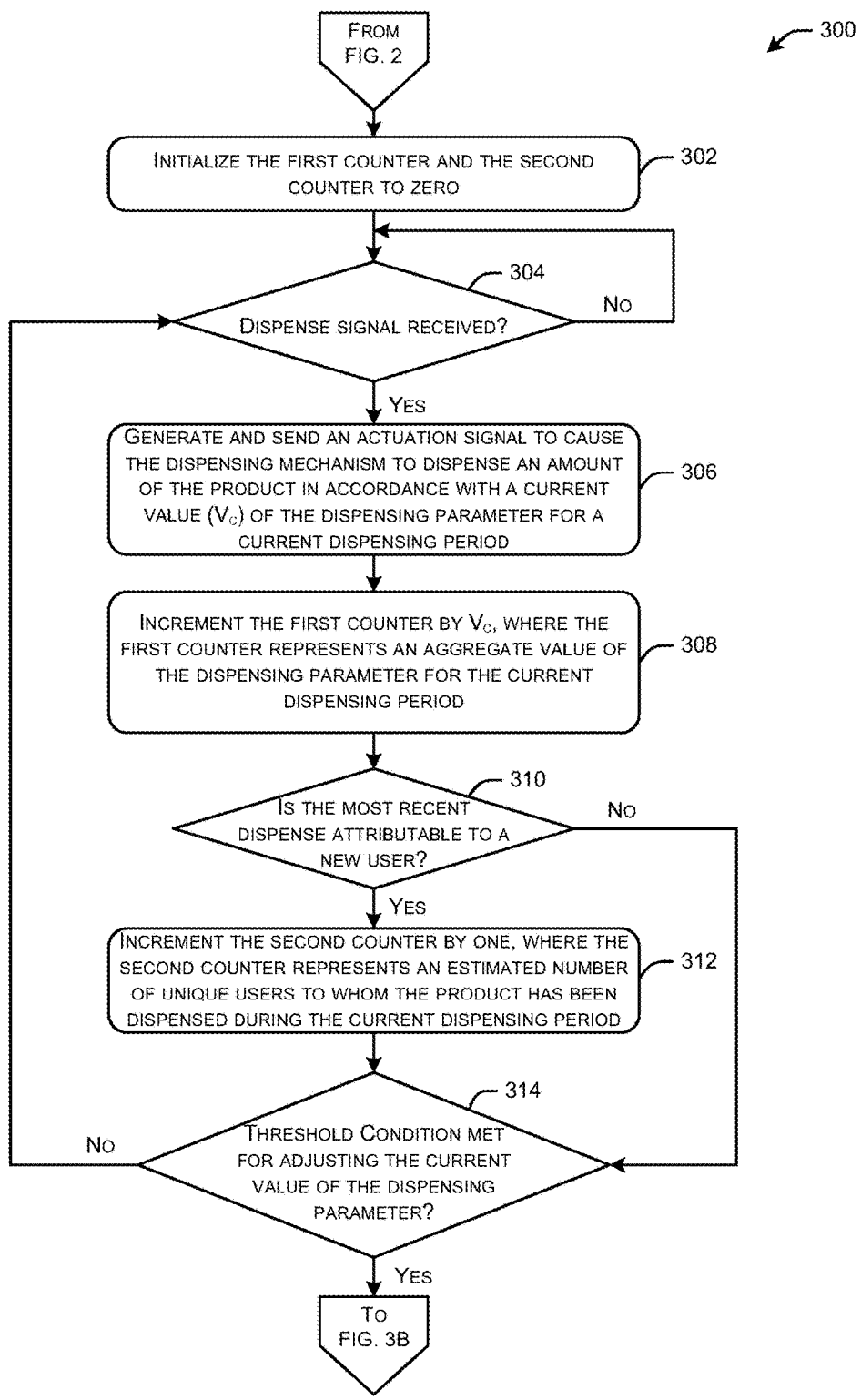
FIGS. 3A-3D are process flow diagrams of an illustrative method for optimizing a value of a dispensing parameter based on product usage data that includes maintaining a first counter representing an aggregate amount of product dispensed during a current dispensing period in accordance with a current value of a dispensing parameter and a second counter representing a number of unique users that received dispenses from the product dispenser during the current dispensing period and comparing the first counter and the second counter to corresponding stored counters associated with a previous dispensing period to determine whether and in what manner to adjust any previous value of the dispensing parameter to obtain an updated value of the dispensing parameter for any subsequent dispensing period to the current dispensing period in accordance with one or more example embodiments of the disclosure.
Figure 3B:
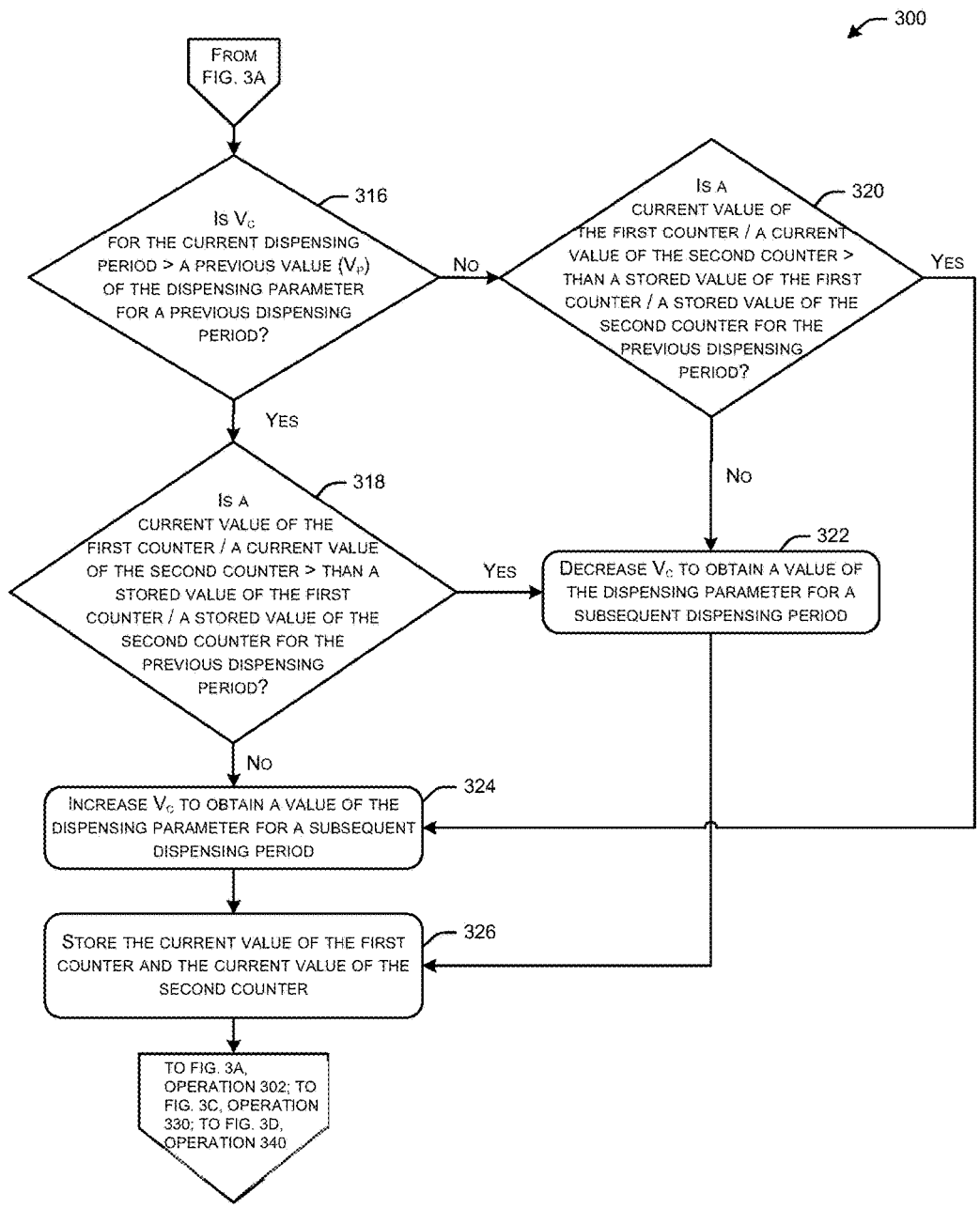

More specifically, referring now to FIG. 3B, computer-executable instructions of the dispensing parameter optimization module(s) 128 may be executed at block 316 to determine whether a current value of the dispensing parameter for the current dispensing period is greater than a previous value of the dispensing parameter for a previous dispensing period. In response to a negative determination at block 316, the method may proceed to block 320. At block 320, computer-executable instructions of the dispensing parameter optimization module(s) 128 may be executed to determine whether a ratio of the current first counter to the current second counter (e.g., aggregate usage per user for the current dispensing period) is greater than a ratio of a previous value of the first counter to a previous value of the second counter for a previous dispensing period (e.g., aggregate usage per user for a dispensing period that preceded the current dispensing period).

In response to an affirmative determination at block 320, the method 300 may proceed to block 324, where computer-executable instructions of the dispensing parameter value adjustment module(s) 130 may be executed to increase the current value of the dispensing parameter to obtain an increased dispensing parameter value for the next dispensing period. On the other hand, in response to a negative determination at block 320, the method 300 may proceed to block 322, where computer-executable instructions of the dispensing parameter value adjustment module(s) 130 may be executed to decrease the current value of the dispensing parameter to obtain a decreased dispensing parameter value for the next dispensing period.

Referring again to block 316, in response to an affirmative determination, the method may proceed to block 318, where computer-executable instructions of the dispensing parameter optimization module(s) 128 may be executed to determine whether a ratio of the current first counter to the current second counter (e.g., aggregate usage per user for the current dispensing period) is greater than a ratio of a previous value of the first counter to a previous value of the second counter for a previous dispensing period (e.g., aggregate usage per user for a dispensing period that preceded the current dispensing period).

In response to a negative determination at block 318, the method 300 may proceed to block 324, where computer-executable instructions of the dispensing parameter value adjustment module(s) 130 may be executed to increase the current value of the dispensing parameter to obtain an increased dispensing parameter value for the next dispensing period. On the other hand, in response to a positive determination at block 318, the method 300 may proceed to block 322, where computer-executable instructions of the dispensing parameter value adjustment module(s) 130 may be executed to decrease the current value of the dispensing parameter to obtain a decreased dispensing parameter value for the next dispensing period.

From either block 324 or block 322, the method 300 may proceed to block 326, where computer-executable instructions of the dispensing parameter optimization module(s) 128 may be executed to store the current values of the first and second counters. Method 300 may then be performed again for a subsequent dispensing period in which dispensing cycles are performed in accordance with the value generated at block 324 or the value generated at block 322. The method 300 may be performed for any number of dispensing periods until an optimized value or optimized range of values for the dispensing parameter is reached. In certain example embodiments, the method 300 may be repeated until a difference in aggregate usage per user between any two (e.g., successive) dispensing periods is within a predetermined threshold. In other example embodiments, the dispensing parameter value may be iteratively adjusted until no change in the aggregate usage per user is observed for some threshold number of iterations. In other example embodiments that dispensing parameter value may be iteratively adjusted indefinitely or as long as the dispenser is operational.

In some example embodiments, the method 300 may proceed to block 330 (FIG. 3C) or block 340 (FIG. 3D) depending on the configuration of the optimization method.

In this regard, example embodiments employing bounding features to the optimization method 300 may proceed to block 330 and/or block 340 depending on the desired bounding feature.

Figure 3C:
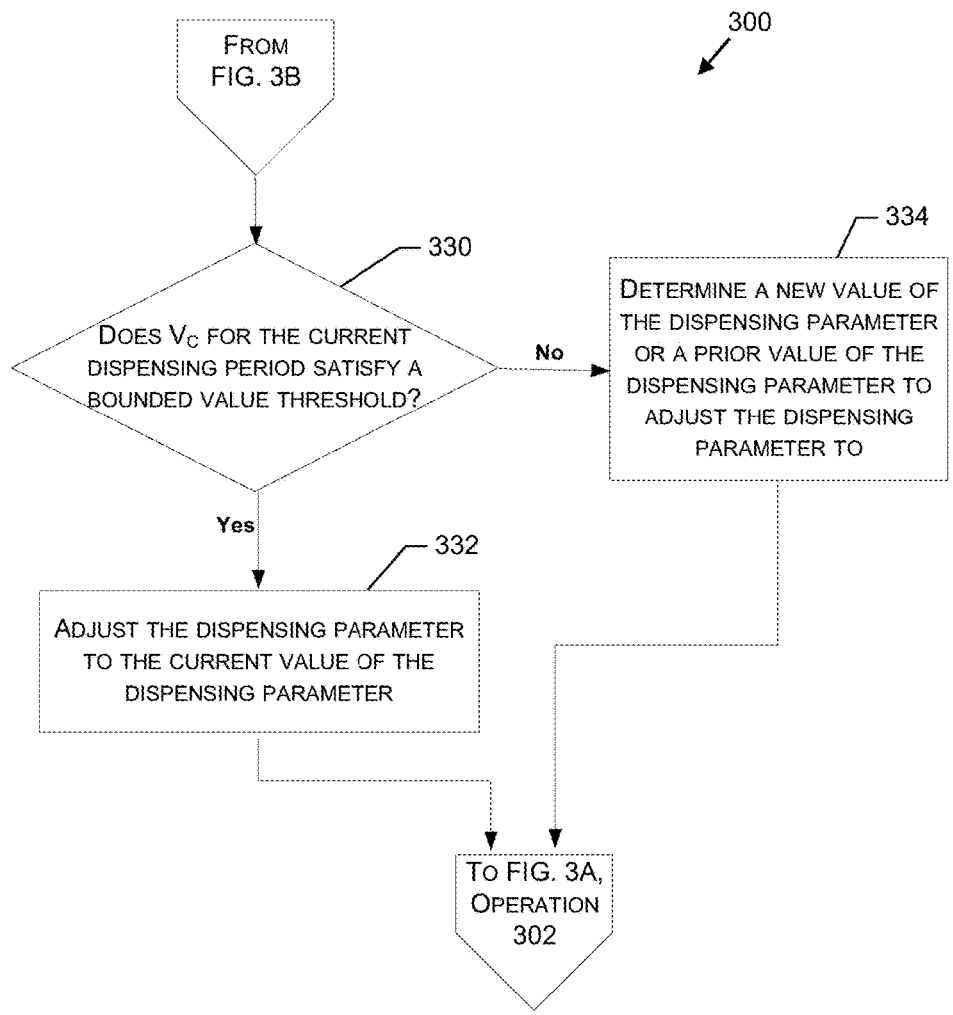

Referring now to FIG. 3C, computer-executable instructions of the dispensing parameter optimization module(s) 128 may be executed at block 330 to determine whether a current value of the dispensing parameter for the current dispensing period satisfies a bounded value threshold. This checks the resulting optimized value of the dispensing parameter against a bounded value to avoid receiving an undesirable result (e.g., bounding the optimization method). Example embodiments of the present invention contemplate many different types of bounded value thresholds and ways to satisfy them. For example, the current value of the dispensing parameter could satisfy the bounded value threshold by being less than or equal to the bounded value threshold. Likewise, the bounded value threshold may be satisfied if the current value of the dispensing parameter is greater than or equal to the bounded value threshold. Furthermore, the bounded value threshold may comprise a range of values such that a current value within the range satisfies the bounded value threshold.

In response to a positive determination at block 330, the method may proceed to block 332. At block 332, computer-executable instructions of the dispensing parameter optimization module(s) 128 may be executed to adjust the dispensing parameter to the current value of the dispensing parameter as determined through the method 300. In this way, the current (optimized) value of the dispensing parameter passed the bounded value test and, thus, will be used moving forward. From there, the method then may be performed again for a subsequent dispensing period in which dispensing cycles are performed in accordance with the value adjusted to at block 332.

In response to a negative determination at block 330, the method may proceed to block 334. At block 334, computer-executable instructions of the dispensing parameter optimization module(s) 128 may be executed to determine a new value of the dispensing parameter or a prior value of the dispensing parameter to adjust the dispensing parameter to. In this way, the current (optimized) value of the dispensing parameter failed the bounded value test and, thus, a different value for the dispensing parameter is needed. From there, the method then may be performed again for a subsequent dispensing period in which dispensing cycles are performed in accordance with the value generated at block 334.

Figure 3D:
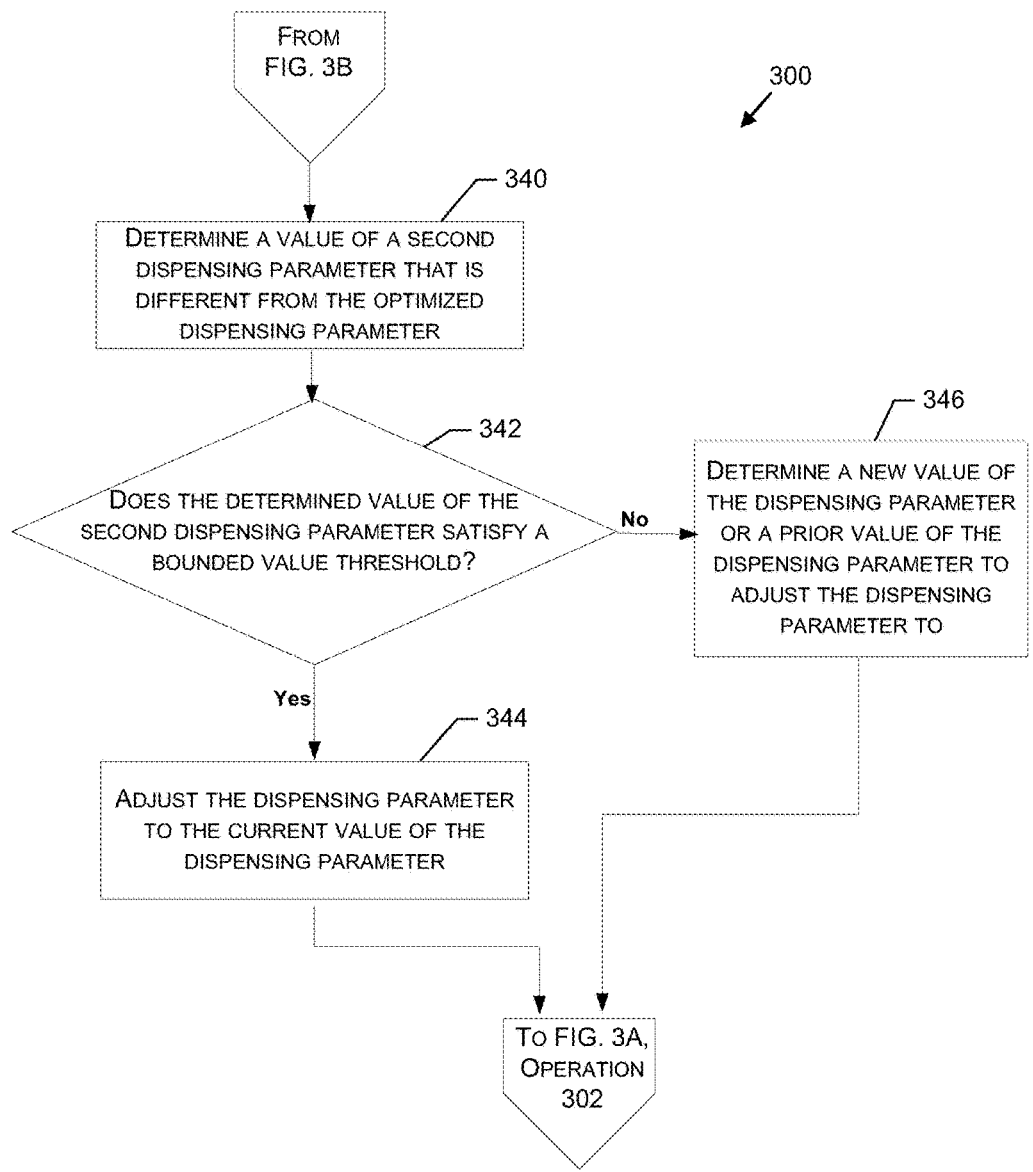

Referring now to FIG. 3D, computer-executable instructions of the dispensing parameter optimization module(s) 128 may be executed at block 340 to determine a value of a second dispensing parameter that is different from the optimized dispensing parameter. Notably, the determined value of the second dispensing parameter is determined based on operation of the product dispenser in accordance with the current value of the dispensing parameter. Then the method may proceed to block 342 where computer-executable instructions of the dispensing parameter optimization module(s) 128 may be executed to determine whether the determined value of the second dispensing parameter satisfies a bounded value threshold. This checks the resulting value of the second dispensing parameter based on operation according to the optimized value of the dispensing parameter against a bounded value to avoid receiving an undesirable result (e.g., bounding the optimization method). Example embodiments of the present invention contemplate many different types of bounded value thresholds and ways to satisfy them. For example, the current value of the second dispensing parameter could satisfy the bounded value threshold by being less than or equal to the bounded value threshold. Likewise, the bounded value threshold may be satisfied if the current value of the second dispensing parameter is greater than or equal to the bounded value threshold. Furthermore, the bounded value threshold may comprise a range of values such that a current value within the range satisfies the bounded value threshold.

In response to a positive determination at block 342, the method may proceed to block 344. At block 344, computer-executable instructions of the dispensing parameter optimization module(s) 128 may be executed to adjust the dispensing parameter to the current value of the dispensing parameter as determined through the method 300. In this way, operation of the product dispenser in accordance with the current (optimized) value of the dispensing parameter passed the bounded value test and, thus, will be used moving forward. From there, the method then may be performed again for a subsequent dispensing period in which dispensing cycles are performed in accordance with the value adjusted to at block 344.

In response to a negative determination at block 342, the method may proceed to block 346. At block 346, computer-executable instructions of the dispensing parameter optimization module(s) 128 may be executed to determine a new value of the dispensing parameter or a prior value of the dispensing parameter to adjust the dispensing parameter to. In this way, operation of the product dispenser in accordance with the current (optimized) value of the dispensing parameter failed the bounded value test and, thus, a different value for the dispensing parameter is needed. From there, the method then may be performed again for a subsequent dispensing period in which dispensing cycles are performed in accordance with the value generated at block 346.

In certain example embodiments, an adjustment in the current dispensing parameter value to obtain the dispensing parameter value for the next dispensing period may result in no change in the aggregate usage per user. In such example embodiments, the current dispensing parameter value may nonetheless be increased or decreased to obtain a dispensing parameter value for the next dispensing period. For example, in those example embodiments, in which the aggregate usage per user is unchanged from a previous dispensing period to a current dispensing period, the direction in which the current dispensing parameter value is adjusted (e.g., whether the current dispensing parameter value is increased or decreased to obtain the dispensing parameter value for the next dispensing period) may be the same as a direction in which the previous dispensing parameter value was adjusted to obtain the current dispensing parameter value.

As previously noted, while the example method 300 has been described in connection with adjusting the current dispensing parameter value to obtain the dispensing parameter value for a subsequent dispensing period, it should be appreciated that the results of comparing the usage data for a current dispensing period to usage data for a previous dispensing period may be used to adjust a dispensing parameter value associated with any previous dispensing period to obtain the dispensing parameter value for a subsequent dispensing period. Further, as previously noted, while the example method 300 has been described in connection with maintaining a first counter of an aggregate value of the dispensing parameter and a second counter of the number of unique users, in other example embodiments, a running average of the usage rate for a dispensing period (e.g., aggregate value of the dispensing parameter/number of unique users) may be maintained in lieu of, or in addition to, maintaining the first and/or second counters.

Figure 4:
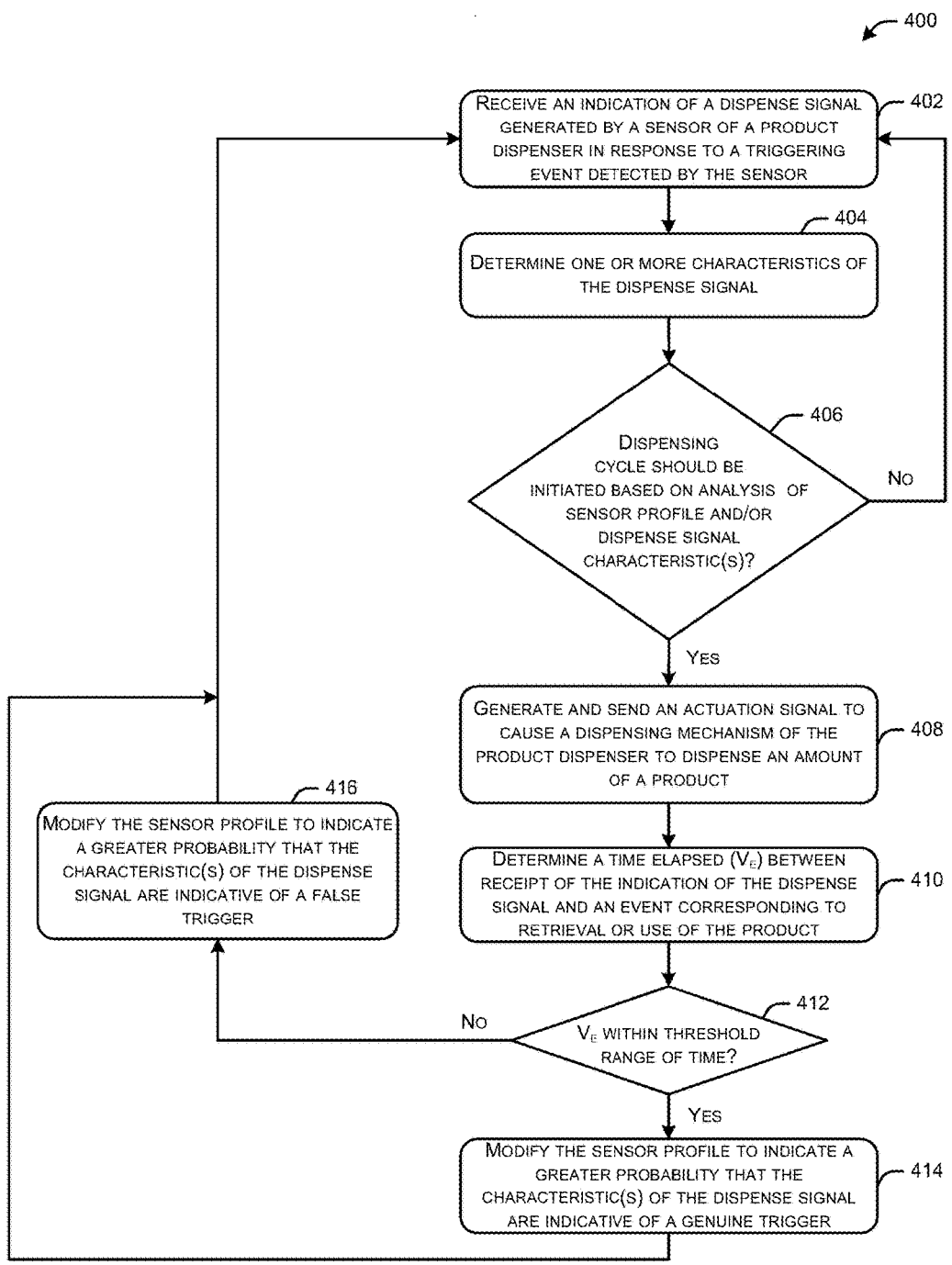
FIG. 4 is a process flow diagram of an illustrative method for optimizing a capability of a product dispenser to distinguish between genuine and false triggers of a user sensor in accordance with one or more example embodiments of the disclosure.

FIG. 4 is a process flow diagram of an illustrative method 400 for optimizing a capability of a product dispenser to distinguish between genuine and false triggers of a user sensor in accordance with one or more example embodiments of the disclosure.

At block 402, an indication may be received of a dispense signal generated by a sensor 120 of the product dispenser 102 in response to a triggering event detected by the sensor 120.

At block 404, computer-executable instructions of the dispensing parameter optimization module(s) 128 may be executed to determine one or more characteristics of the dispense signal. A characteristic of the dispense signal may include, without limitation, an amplitude of the dispense signal, a frequency of the dispense signal, a waveform of the dispense signal, or the like.

At block 406, computer-executable instructions of the dispensing parameter optimization module(s) 128 may be executed to access a sensor profile associated with the sensor 120 to determine, based at least in part on the sensor profile, whether the characteristic(s) of the dispense signal are associated with at least a threshold probability of being indicative of a genuine user-initiated triggering event. In certain example embodiments, the determination at block 406 may include determining that the sensor profile includes or is otherwise associated with a second signal characteristic that matches a first signal characteristic of the dispense signal within a specified tolerance, determining a probability that the second signal characteristic is indicative of a genuine user-initiated triggering event, and further determining that the probability exceeds a threshold probability value. For example, if the first signal characteristic of the dispense signal is a frequency of the dispense signal, the second signal characteristic may be a frequency of a previously received dispense signal. If the two frequencies are within a threshold value of one another, and if a probability that the frequency of the previously received dispense signal is indicative of a genuine user-initiated triggering event meets or exceeds a threshold probability value, a dispensing cycle may be initiated in response to the dispense signal. On the other hand, if the first signal characteristic of the current dispense signal matches a second signal characteristic associated with the sensor profile within a specified tolerance, and if a probability that the second signal characteristic is indicative of a genuine user-initiated triggering event does not meet or exceed the threshold probability value, the dispensing cycle may not be initiated. The threshold probability value may be any suitable value. In certain example embodiments, the threshold probability value may be lower in earlier stages of an optimization process in order to allow for dispenses in more situations, and thus, obtain more data for refining the sensor profile. As the sensor profile becomes more refined, and thus, more capable of distinguishing between genuine and false triggers, the threshold probability value may be increased. In addition, as previously noted, a probability that a dispense signal is indicative of a false trigger may be used and compared to a corresponding threshold probability value in lieu of, or in addition to, a probability that the dispense signal is indicative of a genuine user triggering event.

If, based on an evaluation of the current dispense signal with respect to the sensor profile, a negative determination is made at block 406, then the method 400 may proceed again iteratively from block 402. If, on the other hand, an affirmative determination is made at block 406, the controller(s) 112 may, at block 408, execute computer-executable instructions of the dispensing control module(s) 134 to generate an actuation signal to cause the dispensing mechanism 136 of the product dispenser 102 to dispense an amount of product.

At block 410, the controller(s) 112 may execute the computer-executable instructions of the dispensing parameter optimization module(s) 128 to determine a time that elapses between receipt of the dispense signal (or generation of the actuation signal or completion of the dispensing cycle) and receipt of an indication that the product has been used or retrieved. In other embodiments, the computer-executable instructions may determine a time that elapsed during continuous receipt of the dispense signal. If the product dispenser dispenses towel, retrieval of the dispensed product may be determined based on activation of a tear sensor. If the product dispenser dispenses solids, liquids, gases, or a mixed-phase product such as an aerosol, foam, gel, or the like, such as soap, use/retrieval of the dispensed product may be determined from the completion of a continuous receipt of the dispense signal.

At block 412, the controller(s) 112 may execute computer-executable instructions of the dispensing parameter optimization module(s) 128 to determine whether the elapsed time is within a predetermined threshold range of time. In response to an affirmative determination at block 412, that is, a determination that the elapsed time was within the threshold range of time from a time corresponding to receipt of the dispense signal, generation of the actuation signal, initiation of the dispensing cycle, or completion of the dispensing cycle, then the method 400 may proceed to block 414, where computer-executable instructions of the dispensing parameter optimization module(s) 128 may be executed to modify the sensor profile to indicate an increased likelihood that the characteristic(s) of the dispense signal are indicative of a genuine user trigger, and therefore, a decreased likelihood that the characteristic(s) of the dispense signal are indicative of a genuine trigger.

In response to a negative determination at block 412, that is, a determination that the elapsed time was not within the threshold range of time, then the method 400 may proceed to block 416, where the controller(s) 112 may execute computer-executable instructions of the dispensing parameter optimization module(s) 128 to modify the sensor profile to indicate a decreased likelihood that the characteristic(s) of the dispense signal are indicative of a genuine user trigger, and therefore, an increased likelihood that characteristic(s) of the dispense signal are indicative of a false trigger. From block 414 or block 416, the method 400 may proceed to block 402 and may again proceed iteratively therefrom. The method 400 may continue iteratively such that the sensor profile is refined over time to more accurately distinguish dispense signals indicative of genuine user triggers from dispense signals indicative of false triggers.

Figure 5A:
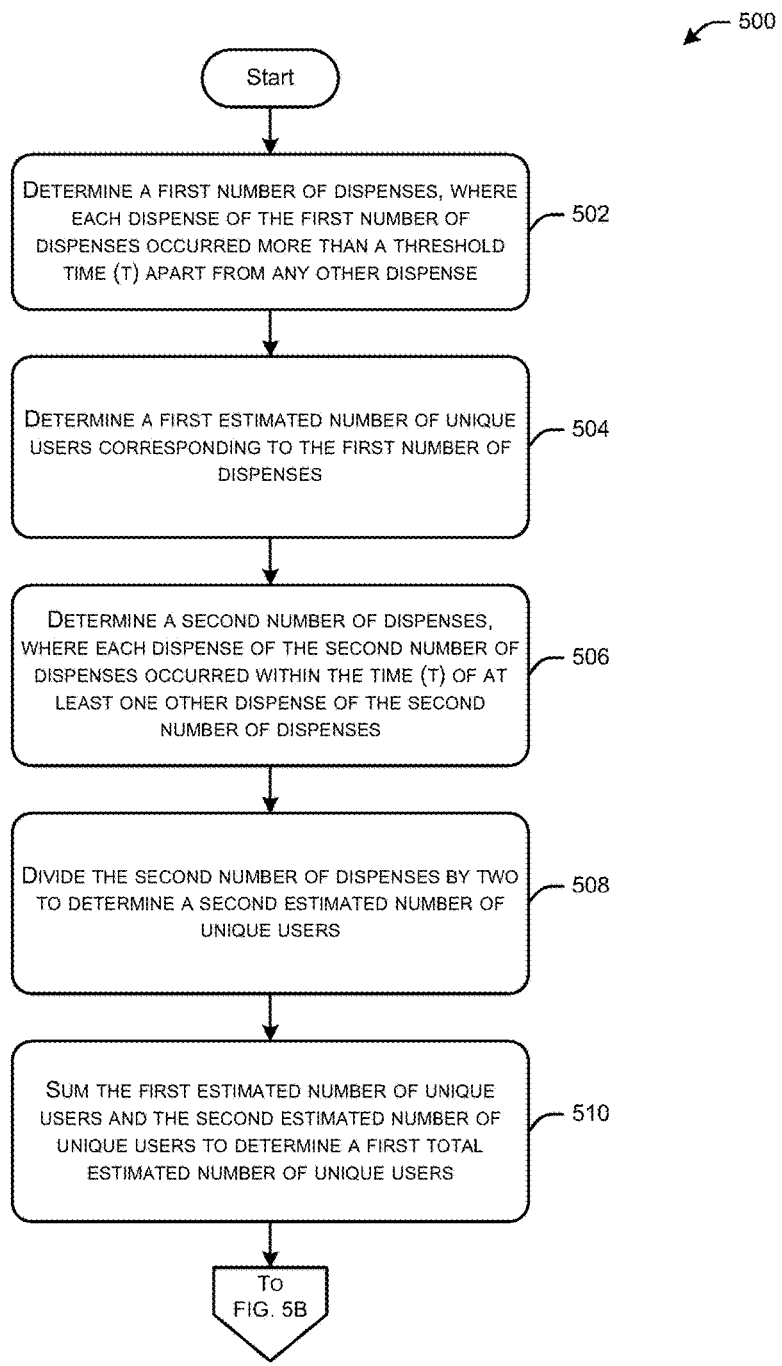
FIGS. 5A-5B are process flow diagrams of an illustrative method for iteratively refining an estimate of a number of unique users that received dispenses from a product dispenser during a dispensing period in accordance with one or more example embodiments of the disclosure.
Figure 5B:
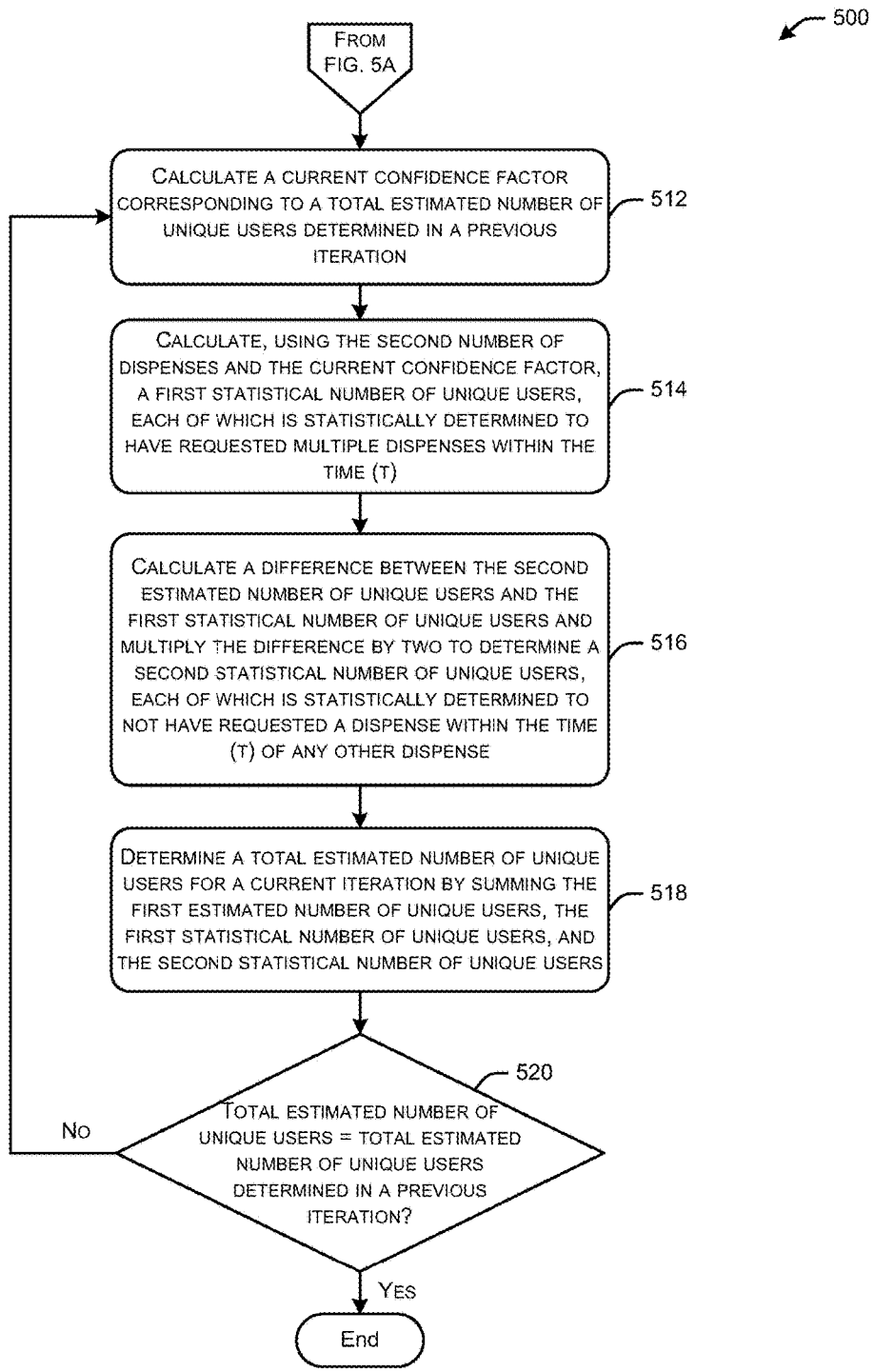

FIGS. 5A-5B are process flow diagrams of an illustrative method 500 for iteratively refining an estimate of a number of unique users that received dispenses from a product dispenser during a dispensing period in accordance with one or more example embodiments of the disclosure. One or more operations of the method 500 may be performed responsive to execution of computer-executable instructions of the unique user determination module(s) 132 by the controller(s) 112.

Method 500 involves the use of a confidence factor to statistically improve the estimate of the number of users that receive dispenses over a period of time (e.g., during a dispensing period). As previously mentioned, the confidence factor may represent an approximate probability that two dispenses that occurred within the threshold period of time were to the same user. A confidence factor may be determined for a given set of usage data. In certain example embodiments, the usage data may be simulated usage data. Alternatively, actual usage data may be used. In those example embodiments in which simulated usage data is used, the simulated usage data may include randomly generated times at which a simulated group of users requests dispenses from a product dispenser. The times of the dispense requests may be ordered and an elapsed time between each successive pair of dispense requests may be determined A respective number of occurrences for each elapsed time may then be determined The number of occurrences for a given elapsed time may correspond to a number of pairs of dispenses that include dispenses that occurred within the elapsed time of one another.

A moving average for the distribution of the respective number of occurrences for each elapsed time may be then determined. Multiple data points may then be selected that are sufficient to determine a best-fit regression line for the distribution. The best-fit regression line and the total number of users to whom the usage data relates may then be used to determine, for each elapsed time, a probability that two users will request dispenses separated by that elapsed time. A cumulative probability may also be determined with respect to each elapsed time, where the cumulative probability represents a probability that two users will request dispenses that are separated by that elapsed time or any shorter interval of time. The above-described process may be repeated for multiple usage datasets corresponding to different amounts of user traffic (e.g., different numbers of users per hour). In this manner, for each group consisting of a different number of users per hour, a respective cumulative probability that two users will randomly request dispenses within a selected threshold period of time (e.g., 10 seconds) may be determined Corresponding confidence factors may also be calculated for each group. For any given group of users, the corresponding confidence factor for the threshold period of time may equal 1 minus the corresponding cumulative probability for the threshold period of time. The confidence factors may then be plotted against the corresponding user traffic rates (e.g., number of users per hour) and a best-fit regression line may be determined An equation representing this best-fit regression line may be used to statistically approximate the confidence factor corresponding to any given user traffic rate.

Example data showing cumulative probabilities and confidence factors corresponding to different user traffic rates and the approximate equation of the corresponding best-fit regression line are shown below.

|  | Users per Hour | | | |
| --- | --- | --- | --- | --- |
|  | 60 | 25 | 14 | 10 |
| Cumulative Probability for Threshold Period of Time of 10 s | 18.0% | 7.5% | 4.7% | 3.5% |
| Confidence Factor | 82% | 92.5% | 95.3% | 96.5% |

$$C(\%) = 100\% - 0.29\% * (\# \text{ of users/hr}) \quad \text{Eq}(1):$$

It should be appreciated that the above-described process is merely an illustrative way to determine the confidence factor. For example, user traffic may be measured using a different time frame than an hour. Further, a different threshold of time may be chosen which, in turn, would correspond to different confidence factors and different cumulative probabilities. Further, the confidence factor may be determined using any suitable statistical approach and need not be determined based on simulated usage data.

One or more confidence factors—as determined from Eq(1) for example—may be used to successively refine an estimate of a number of unique users that receive product dispenses over some period of time (e.g., a dispensing period). Referring to FIG. 5A, blocks 502-510 may include operations to determine an initial estimate of the number of unique users over a period of time (e.g., over the course of a dispensing period). A period of 10 seconds will be used as an example threshold period of time for ease of explanation in describing the operations of method 500. However, it should be appreciated that any suitable threshold period of time may be chosen.

At block 502, a first number of dispenses, each of which did not occur within, for example, 10 seconds of any other dispense, may be determined. Stated another way, a first number of dispenses may be determined, each of which occurred more than 10 seconds apart from any other dispense. At block 504, a first estimated number of unique users corresponding to the first number of dispenses may be determined The first estimated number of unique users may equal the first number of dispenses.

At block 506, a second number of dispenses may then be determined Each dispense in the second number of dispenses may have occurred within, for example, 10 seconds of at least one other dispense in the second number of dispenses. At block 508, the second number of dispenses may then be divided by two to obtain a second estimated number of unique users (based on the assumption that each pair of dispenses that occurred within 10 seconds of one another were received by the same user).

At block 510, the first estimated number of unique users and the second estimated number of unique users may then be summed to obtain a first total estimated number of unique users.

FIG. 5B generally depicts any iteration of a process for refining an estimate of a number of unique users. While FIG. 5B will be described in connection with a second iteration following the initial operations depicted in FIG. 5A, it should be appreciated that the operations of FIG. 5B may correspond to any iteration of the process for refining the estimate. Referring now to FIG. 5B, at block 512, a confidence factor may be determined for the first total estimated number of unique users. For example, the confidence factor may be determined by inserting the first estimated total number of users into Eq(1) from above. At block 514, a first statistical number of unique users may be determined using the confidence factor determined at block 512, each of whom is statistically assumed to have received at least two dispenses within 10 seconds of each other. The first statistical number of unique users may be determined by multiplying the second number of dispenses by the confidence factor and dividing the result by two.

At block 516, a second statistical number of unique users, each of whom is statistically determined to have received a dispense more than 10 seconds apart from any other dispense, may then be determined. The second statistical number of unique users may be determined by subtracting the first statistical number of unique users from the second estimated number of unique users. At block 518, the first estimated number of unique users, the first statistical number of unique users, and the second statistical number of unique users may then be summed to obtain a second total estimated number of unique users.

At block 520, a determination may be made as to whether the second total estimated number of unique users equals the first total estimated number of unique users. In response to a negative determination at block 520 (e.g., if the difference between the first total and the second total is non-zero), the method 500 may be repeated from block 512. More specifically, a new confidence factor may be determined based on the second total estimated number of unique users, and the operations of FIG. 5B may be repeated using the second confidence factor to obtain a third total estimated number of unique users. The operations of FIG. 5B may be iteratively performed to refine the estimate of the number of actual unique users until the statistical estimate is unchanged from one iteration to the next. It should be appreciated that, in certain example embodiments, a positive determination may be made at block 520 if the total estimated number of unique users for the current iteration and the total estimated number of unique users for a previous iteration are within some threshold difference from one another.

One or more operations of the methods 200-500 may have been described above as being performed by a product dispenser 102, or more specifically, by one or more program modules executing on such a device. It should be appreciated, however, that any of the operations of methods 200-500 may be performed, at least in part, in a distributed manner by one or more other devices, or more specifically, by one or more program modules, applications, or the like executing on such devices. In addition, it should be appreciated that processing performed in response to execution of computer-executable instructions provided as part of an application, program module, or the like may be interchangeably described herein as being performed by the application or the program module itself or by a device on which the application, program module, or the like is executing. While the operations of the methods 200-500 may be described in the context of the illustrative product dispenser 102, it should be appreciated that such operations may be implemented in connection with numerous other device configurations.

The operations described and depicted in the illustrative methods of FIGS. 2-5B may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 2-5B may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Program modules, applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program modules, or other data transmitted within a data signal, such as a carrier wave, or other transmission. However, as used herein, CRSM does not include CRCM.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

The invention claimed is:

1. A method for bounding a dispensing parameter of one or more product dispensers, wherein at least one product dispenser of the one or more product dispensers comprises a controller housed therein, wherein the controller is configured to perform the method comprising:
    receiving usage data from a dispensing period of the one or more product dispensers, wherein the dispensing period comprises a plurality of dispenses of product by at least one dispensing mechanism of the one or more product dispensers performed in accordance with a value of the dispensing parameter;
    determining, based on the usage data from the dispensing period, a usage rate of the product, wherein the usage rate is based on an amount of product dispensed during the dispensing period and a number of users of the one or more product dispensers during the dispensing period;
    determining, based on at least the usage rate and the value of the dispensing parameter from the dispensing period, an improved value for the dispensing parameter such that at least one of the one or more product dispensers has an improved usage rate when the dispensing parameter is set to the optimized value;
    comparing the determined improved value of the dispensing parameter with a bounded value threshold to determine if the improved value satisfies the bounded value threshold; and
    causing the one or more product dispensers to adjust the dispensing parameter to the improved value in an instance in which the improved value satisfies the bounded value threshold.

2. The method of claim 1, wherein the value of the dispensing parameter is a first value of the dispensing parameter, wherein the dispensing period is a first dispensing period, wherein the usage rate is a first usage rate, and wherein determining the improved value for the dispensing parameter comprises:
    receiving second usage data from a second dispensing period of the one or more product dispensers, wherein the second dispensing period comprises a second plurality of dispenses of product by the at least one dispensing mechanism of the one or more product dispensers performed in accordance with a second value of the dispensing parameter;
    determining, based on the second usage data from the second dispensing period, a second usage rate of the product, wherein the second usage rate is based on an amount of product dispensed during the second dispensing period and a number of users of the one or more product dispensers during the second dispensing period; and
    determining the improved value of the dispensing parameter based on the first usage rate of the first dispensing period, the first value of the dispensing parameter, the second usage rate of the second dispensing period, and the second value of the dispensing parameter.

3. The method of claim 1, wherein determining the improved value for the dispensing parameter comprises comparing the usage rate of the dispensing period to a pre-determined optimal usage rate.

4. The method of claim 1, wherein the product is paper towel, wherein the dispensing parameter is sheet length of the paper towel per dispense, and wherein the bounded value threshold is one of a minimum sheet length or a maximum sheet length.

5. The method of claim 1 further comprising determining, in an instance in which the optimized value does not satisfy the bounded value threshold, a revised improved value of the dispensing parameter such that the one or more product dispensers are configured to have an improved usage rate when the dispensing parameter is set to the revised improved value and the revised improved value satisfies the bounded value threshold.

6. The method of claim 1, wherein the bounded value threshold is based on determined user frustration.

7. The method of claim 1 further comprising determining the bounded value threshold based on a position of a bounded value threshold switch of the one or more product dispensers.

8. A method for bounding a dispensing parameter of one or more product dispensers, wherein at least one product dispenser of the one or more product dispensers comprises a controller housed therein, wherein the controller is configured to perform the method comprising:
    receiving usage data from a dispensing period of one or more product dispensers, wherein the dispensing period comprises a plurality of dispenses of product by at least one dispensing mechanism of the one or more product dispensers performed in accordance with a value of a first dispensing parameter;
    determining, based on the usage data from the dispensing period, a usage rate of the product, wherein the usage rate is based on an amount of product dispensed during the dispensing period and a number of users of the one or more product dispensers during the dispensing period;
    determining, based on at least the usage rate and the value of the first dispensing parameter from the dispensing period, an improved value for the first dispensing parameter such that at least one of the one or more product dispensers has an improved usage rate when the first dispensing parameter is set to the improved value;
    determining a value of a second dispensing parameter;
    comparing the value of the second dispensing parameter with a bounded value threshold to determine if the value of the second dispensing parameter satisfies the bounded value threshold; and
    causing the one or more product dispensers to adjust the first dispensing parameter to the improved value in an instance in which the value of the second dispensing parameter satisfies the bounded value threshold.

9. The method of claim 8, wherein determining the value of the second dispensing parameter comprises performing a theoretical operation of the one or more product dispensers using the improved value for the first dispensing parameter.

10. The method of claim 8, wherein determining the value of the second dispensing parameter comprises determining the value of the second dispensing parameter based on the usage data of the dispensing period.

11. The method of claim 8, wherein the value of the first dispensing parameter is a first value of the first dispensing parameter, wherein the dispensing period is a first dispensing period, wherein the usage rate is a first usage rate, and wherein determining the improved value for the first dispensing parameter comprises:
    receiving second usage data from a second dispensing period of the one or more product dispensers, wherein the second dispensing period comprises a second plurality of dispenses of product by the at least one dispensing mechanism of the one or more product dispensers performed in accordance with a second value of the first dispensing parameter;
    determining, based on the second usage data from the second dispensing period, a second usage rate of the product, wherein the second usage rate is based on an amount of product dispensed during the second dispensing period and a number of users of the one or more product dispensers during the second dispensing period; and
    determining the improved value of the first dispensing parameter based on the first usage rate of the first dispensing period, the first value of the first dispensing parameter, the second usage rate of the second dispensing period, and the second value of the first dispensing parameter.

12. The method of claim 8, wherein determining the improved value for the first dispensing parameter comprises comparing the usage rate of the dispensing period to a pre-determined optimal usage rate.

13. The method of claim 8, wherein the product is paper towel, wherein the second dispensing parameter is an average number of sheets of paper towel per dispenser per user, and wherein the bounded value threshold is one of a minimum average number of sheets of paper towel per dispenser per user or a maximum average number of sheets of paper towel per dispenser per user.

14. The method of claim 8 further comprising determining, in an instance in which the value of the second dispensing parameter does not satisfy the bounded value threshold, a revised improved value of the first dispensing parameter such that at least one of the one or more product dispensers has an improved usage rate when the first dispensing parameter is set to the revised improved value and a revised value of the second dispensing parameter satisfies the bounded value threshold.

15. The method of claim 8, wherein the bounded value threshold is based on determined user frustration.

16. The method of claim 8 further comprising determining the bounded value threshold based on a position of a bounded value threshold switch of the one or more product dispensers.

17. A product dispenser comprising
    at least one dispensing mechanism;
    at least one memory with computer-executable instructions stored thereon; and
    a controller housed in the product dispenser and operatively coupled to the dispensing mechanism and the at least one memory, wherein the controller is configured to access the at least one memory and execute the computer-executable instructions to:
        receive usage data from a dispensing period of the product dispenser, wherein the dispensing period comprises a plurality of dispenses of product by the at least one dispensing mechanism performed in accordance with a value of a dispensing parameter;
        determine, based on the usage data from the dispensing period, a usage rate of the product, wherein the usage rate is based on an amount of product dispensed during the dispensing period and a number of users of the product dispenser during the dispensing period;

determine, based on at least the usage rate and the value of the dispensing parameter from the dispensing period, an improved value for the dispensing parameter such that the product dispenser has an improved usage rate when the dispensing parameter is set to the optimized value;

compare the determined improved value of the dispensing parameter with a bounded value threshold to determine if the improved value satisfies the bounded value threshold; and cause adjustment of the dispensing parameter to the improved value in an instance in which the improved value satisfies the bounded value threshold.

18. The product dispenser of claim 17, wherein the product is paper towel, wherein the dispensing parameter is sheet length of the paper towel per dispense, and wherein the bounded value threshold is one of a minimum sheet length or a maximum sheet length.

19. The product dispenser of claim 17 further comprising a bounded value threshold switch that is configured to be positioned to one of a plurality of bounded value threshold positions, wherein each bounded value threshold position corresponds to a different bounded value threshold for the dispensing parameter, and wherein the controller is configured to execute the computer-executable instructions to determine the bounded value threshold of the dispensing parameter based on the position of the bounded value threshold switch.

20. A product dispenser comprising
at least one dispensing mechanism;
at least one memory with computer-executable instructions stored thereon; and
a controller housed in the product dispenser and operatively coupled to the dispensing mechanism and the at least one memory, wherein the controller is configured to access the at least one memory and execute the computer-executable instructions to:
receive usage data from a dispensing period of the product dispenser, wherein the dispensing period comprises a plurality of dispenses of product by the at least one dispensing mechanism performed in accordance with a value of a first dispensing parameter;

determine, based on the usage data from the dispensing period, a usage rate of the product, wherein the usage rate is based on an amount of product dispensed during the dispensing period and a number of users of the product dispenser during the dispensing period;

determine, based on at least the usage rate and the value of the first dispensing parameter from the dispensing period, an improved value for the first dispensing parameter such that the product dispenser is configured to have an improved usage rate when the first dispensing parameter is set to the improved value;

determine a value of a second dispensing parameter;

compare the value of the second dispensing parameter with a bounded value threshold to determine if the value of the second dispensing parameter satisfies the bounded value threshold; and cause adjustment of the first dispensing parameter to the improved value in an instance in which the value of the second dispensing parameter satisfies the bounded value threshold.

21. The product dispenser of claim 20, wherein the product is paper towel, wherein the second dispensing parameter is an average number of sheets of paper towel per dispenser per user, and wherein the bounded value threshold is one of a minimum average number of sheets of paper towel per dispenser per user or a maximum average number of sheets of paper towel per dispenser per user.

22. The product dispenser of claim 20 further comprising a bounded value threshold switch that is configured to be positioned to one of a plurality of bounded value threshold positions, wherein each bounded value threshold position corresponds to a different bounded value threshold for the second dispensing parameter, and wherein the controller is configured to execute the computer-executable instructions to determine the bounded value threshold of the second dispensing parameter based on the position of the bounded value threshold switch.

* * * * *